(12) United States Patent
Yu et al.

(10) Patent No.: US 6,504,846 B1
(45) Date of Patent: Jan. 7, 2003

(54) METHOD AND APPARATUS FOR RECLAIMING BUFFERS USING A SINGLE BUFFER BIT

(75) Inventors: Ching Yu, Santa Clara, CA (US); Xiaohua Zhuang, Santa Clara, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/315,724

(22) Filed: May 21, 1999

(51) Int. Cl.⁷ ............................................... H04L 12/56
(52) U.S. Cl. ..................................... 370/412; 370/395.7
(58) Field of Search ................................. 370/229, 230, 370/389, 390, 395.1, 398, 412, 413, 415, 417, 428, 395.7, 395.71, 395.72

(56) References Cited

U.S. PATENT DOCUMENTS

| | | | | |
|---|---|---|---|---|
| 5,229,991 A | * | 7/1993 | Turner | 370/389 |
| 5,410,540 A | * | 4/1995 | Aiki et al. | 370/390 |
| 5,515,376 A | | 5/1996 | Murthy et al. | |
| 5,689,505 A | * | 11/1997 | Chiussi et al. | 370/388 |
| 5,751,951 A | * | 5/1998 | Osborne et al. | 709/250 |
| 5,875,189 A | * | 2/1999 | Brownhill et al. | 370/395.7 |
| 5,898,687 A | * | 4/1999 | Harriman et al. | 370/389 |
| 5,923,654 A | * | 7/1999 | Schnell | 370/390 |
| 6,233,244 B1 | * | 5/2001 | Runaldue et al. | 370/412 |
| 6,320,861 B1 | * | 11/2001 | Adam et al. | 370/395.7 |
| 6,330,640 B1 | * | 12/2001 | Williams et al. | 710/52 |

* cited by examiner

Primary Examiner—Hassan Kizou
Assistant Examiner—David Odland

(57) ABSTRACT

A method and apparatus are disclosed for reclaiming frame buffers used to store data frames received by a network switch. The apparatus includes a multicopy queue for queuing entries corresponding to received data frames which must be transmitted by multiple output ports of the network switch, a free buffer queue for queuing frame pointers that identify locations in an external memory where reclaimed frame buffers are located, and a multicopy circuit that retrieves entries from the multicopy queue and determines if all copies of a received data frame have been transmitted by the specified output ports. The multicopy circuit also reclaims one or more frame buffers, based on the size of the received data frame. The present invention allows efficient reclaiming of frame buffers regardless of whether the received data frame is stored in a single frame buffer or multiple frame buffers.

27 Claims, 13 Drawing Sheets

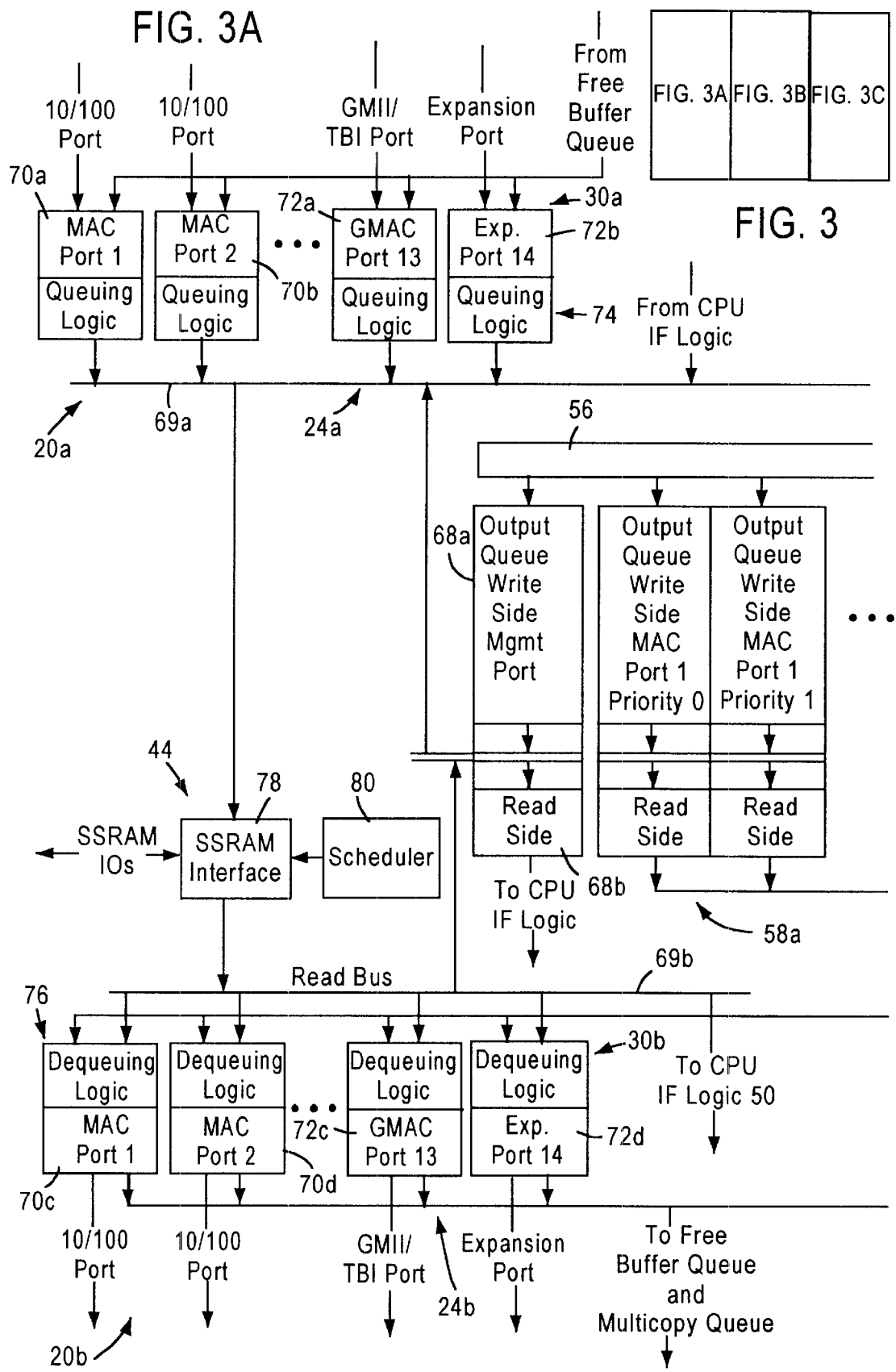

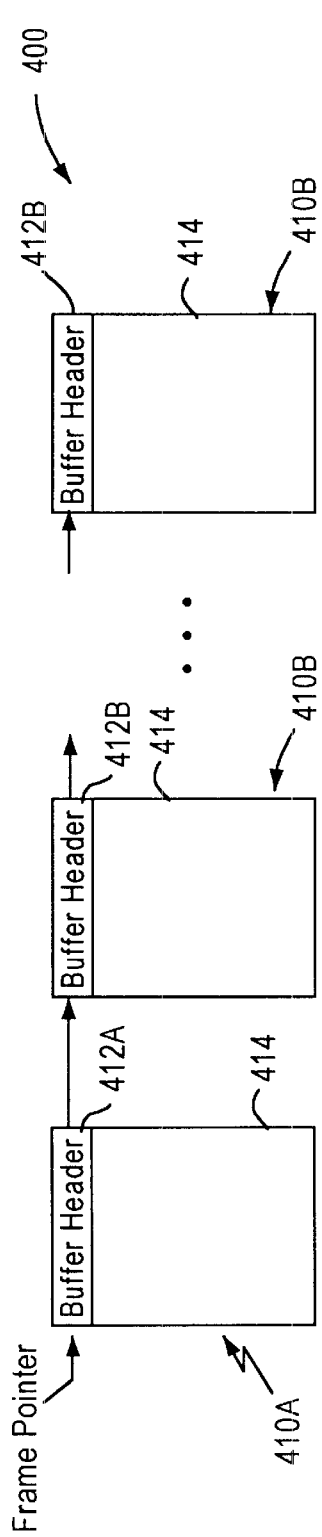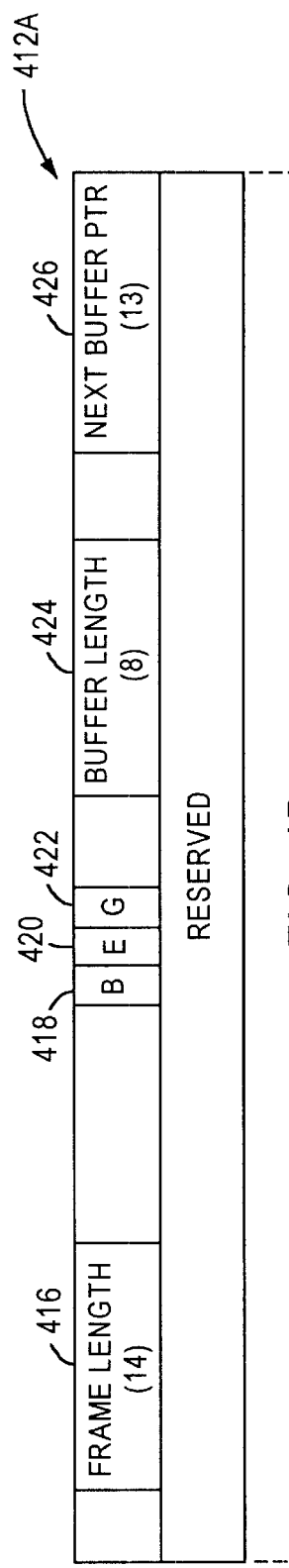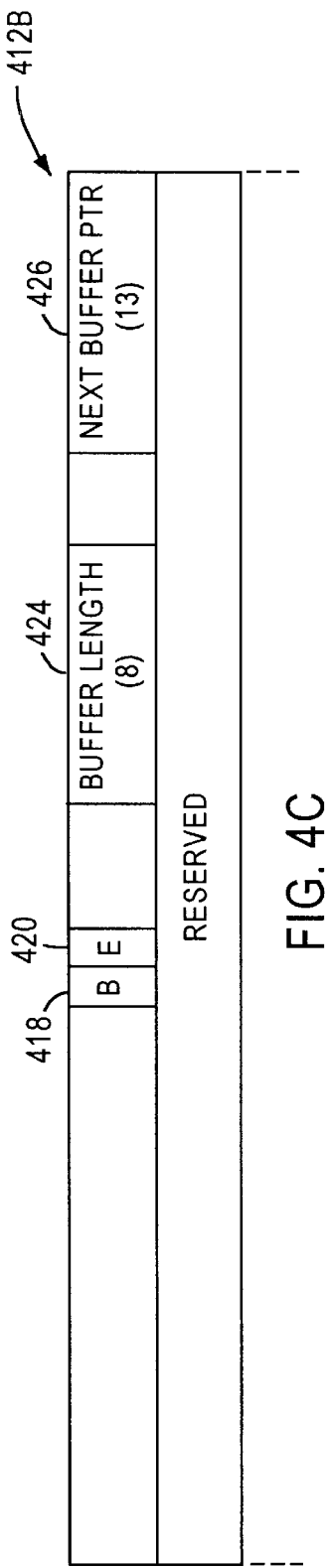

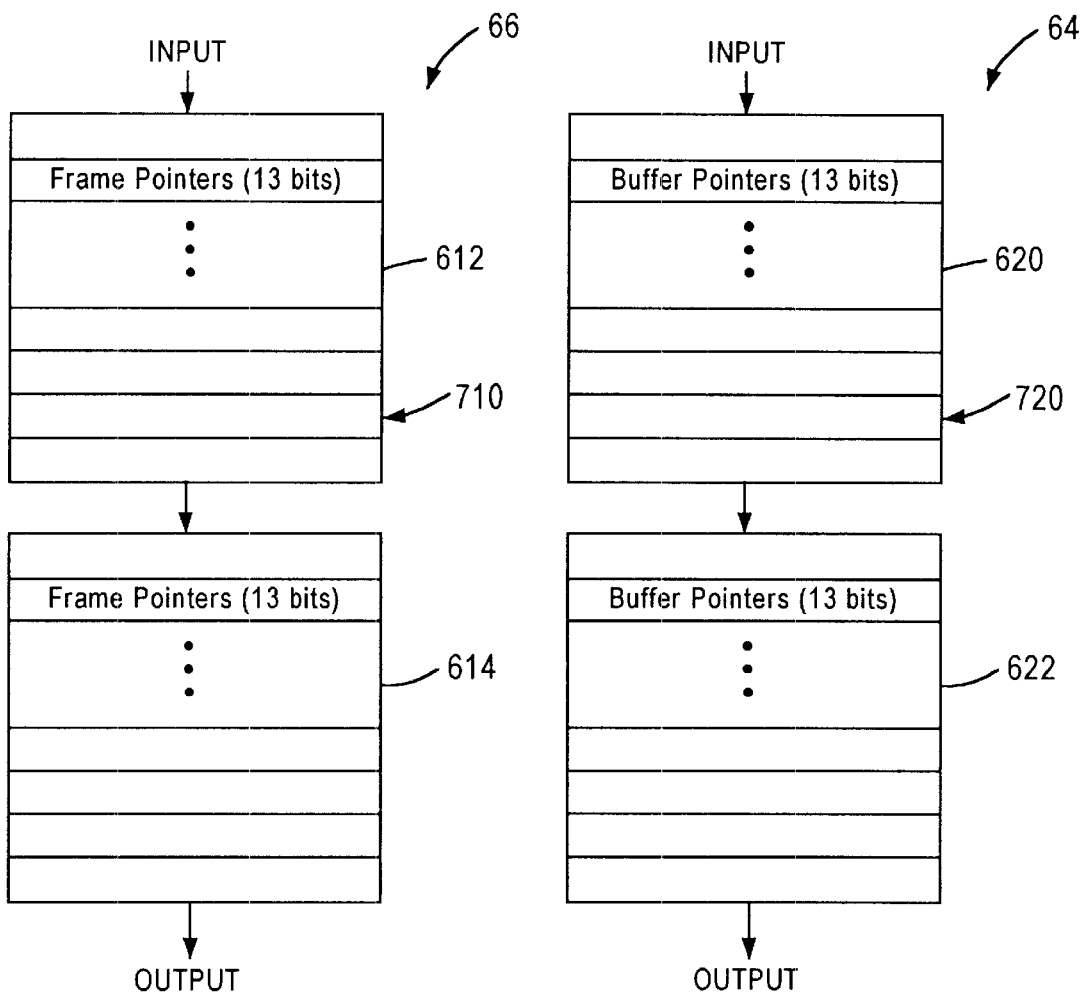

METHOD AND APPARATUS FOR RECLAIMING BUFFERS USING A SINGLE BUFFER BIT

BACKGROUND OF THE INVENTION

1. Field of the Invention

The present invention relates to communication systems, and more particularly, to a method and apparatus for reclaiming memory buffers used for temporary storage of received data in a communication system.

2. Description of the Related Art

Modern communication systems, such as computer networking systems or communication networks, provide constant transmission of data between end stations and/or intermediate stations such as routers and signal amplifiers. Computer networking systems, such as packet switched networks (e.g., Ethernet networks), often require transmission of data to a single end station or to multiple end stations within the network. The data originates from a user program and is segmented into multiple data frames, and subsequently transmitted in order to simplify processing and minimize the retransmission time required for error recovery. For example, in a conventional e-mail system, a user may desire to send the same e-mail message to four different users that are connected to the e-mail system. Accordingly, the identical data would be directed to multiple end stations.

Packet switched computer networks typically employ a network switch that receives and forwards data frames to individual and/or multiple end stations. The network switch makes forwarding decisions upon receipt of data frames based on information contained in a header of the data frame. For example, if a received data frame is to be transmitted to a number of end stations, the switch must make the forwarding decision to forward the data frame to the ports of the correct end stations. Depending on the specific implementation and/or characteristic of the networking system (i.e., data transfer rate, traffic intensity, etc.), buffers must be provided for temporary storage of the data frames, received by the switch, until forwarding decisions can be made. The buffers used to store the data frames are often implemented as first in, first out (FIFO) queues.

In packet switched networks that utilize buffers to temporarily store data frames prior to transmission to the appropriate end station, it is common for the size of an individual data frame to be larger than the capacity of an individual buffer. Buffers are typically allocated a static amount of memory, hence requiring that multiple buffers be used to store a single frame of data that exceeds the buffer's capacity. Buffering the data as it is received allows, for example, robust error checking to be performed on the data frames, and also permits rate matching between transmitting and receiving ports. When data frames arrives at a network switch, only buffers that are currently available (i.e., "free") may be used to store the data frames, in order to prevent overwriting of a first data frame by a second data frame prior to transmission. Once the data frames have been transmitted, or is otherwise determined to be no longer necessary, the buffers storing the data frames may be reused to store newly received data frames. In addition, it is possible for buffers to be set aside for storing incoming data frames, but because of error checking or an insufficient amount of data received, the data frames must be discarded. In such circumstances, the buffers must be returned for reuse in order to avoid a potential situation wherein all of the system buffers are improperly set aside to receive data frames that have been discarded.

For purposes of efficiency and continued operation of the network system, it is imperative that buffers be available to store incoming data frames to the extent possible. In addition, the return of the buffers for reuse should be performed as quickly as possible after the buffers are no longer needed.

In systems that employ multiple buffers to store a single data frame, the network switch monitors the transmission of the data frame, and begins the process of reclaiming the individual buffers that store the data frame after the entire data frame has been transmitted. If multiple copies of the same data frame must be transmitted, then the network switch waits until all copies of the data frame have been transmitted before beginning the process of reclaiming the buffers used to store the data frame. Hence, different reclaiming procedures would be more efficient depending on whether a single copy of the frame is transmitted, or multiple copies of the frame are transmitted, and whether the data frame is stored in a single frame buffer or multiple frame buffers.

Accordingly, a primary disadvantage associated with current methods of transmitting data in communication systems, such as a packet switched computer networking system, is the amount of time required to free the buffers that are used to store incoming data frames, once the data frames have been transmitted.

Another disadvantage associated with current methods of transmitting data in communication systems is the inefficiency associated with utilizing the same circuitry (or method) to reclaim buffers regardless of whether a data frame is stored in a single frame buffer or multiple frame buffers.

DISCLOSURE OF THE INVENTION

There is a need for an arrangement and a method for quickly reclaiming buffers that store data frames upon transmission of the data frames so that the buffers can be available to store newly received data frames.

There is also a need for an arrangement and method that distinguishes between single and multiple buffer data frames, and efficiently reclaims buffers depending on whether a data frame is stored in one buffer or multiple buffers.

These and other needs are addressed by the present invention, wherein a multiport switch determines whether a particular data frame is stored in one frame buffer or multiple frame buffers, and places the corresponding frame pointer into either a reclaim queue or a free buffer queue based on such a determination.

In accordance with one aspect of the present invention, an apparatus for reclaiming frame buffers used to store data frames received by a network switch comprises a multicopy queue, a free buffer queue, and a multicopy circuit. The multicopy queue stores entries corresponding to received data frames which must be transmitted to multiple output ports of the network switch. Each entry queued by the multicopy queue includes a frame pointer that addresses a location in memory where frame buffers for storing the received data frames are located. The free buffer queue stores frame pointers that identify locations in the memory where reclaimed frame buffers are located. Each reclaimed frame buffer is available for storing newly received data frames. The multicopy circuit retrieves entries from an output portion of the multicopy queue, and determines if all copies of a received data frame have been transmitted by the multiple output ports. If all copies of the received data frame have been transmitted, then the multicopy circuit reclaims one or more frame buffers based on the size of the received data frame.

The present apparatus efficiently reclaims frame buffers by determining whether a received data frame is stored in one frame buffer or multiple frame buffers. If it is determined that only one frame buffer is used to store the data frame, then the multicopy circuit may place the frame pointer directly into the free buffer queue. If, however, multiple frame buffers are used to store the data frame, then the multicopy queue places the frame pointer in the reclaim queue so that the reclaim queue may use the frame pointer to access the first frame buffer, and walks a linked list of frame buffers in order to free all of the frame buffers used to store the data frame.

According to one specific implementation of the present invention, the multicopy circuit includes a searchable memory area for storing values corresponding to the number of copies of each received data frame that must be transmitted, and a search engine for searching the searchable memory area and updating the values stored therein to reflect the current number of copies of each received data frame that remain to be transmitted. The search engine may be configured to retrieve entries from an output portion of the multicopy queue, decode addresses specified by frame pointers stored in the retrieved entries into corresponding address locations in the searchable memory area, and update the values stored in the searchable memory area based on copy numbers stored in the retrieved entries and the decoded addresses.

The searchable memory area provides a one-to-one correspondence with the total number of frame pointers available to the network switch. This allows the search engine to continually service the multicopy queue and place entries into the searchable memory area.

In accordance with another aspect of the present invention, a method of reclaiming buffers used to store data frames received by a network switch comprises the steps: inputting entries into a multicopy queue that queues entries corresponding to received data frames which must be transmitted to multiple output ports of the network switch, the entries storing frame pointers that address locations in memory where frame buffers that are no longer needed to store received data frames are located; determining if all copies of a received data frame have been output to the multiple output ports; and if all copies of the received data frame have been output to the multiple output ports, then reclaiming one or more frame buffers used for storing the received data frame, based on the size of the received data frame.

The present arrangement provides an efficient method of reclaiming frame buffers based on whether a received data frame is stored in one frame buffer or multiple frame buffers. Accordingly, an appropriate and efficient course of action for reclaiming the frame buffers may be made upon determining the size of the received data frame.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 4A illustrates a linked list data structure used to store received data frames in the external memory, according to an exemplary embodiment of the present invention;

FIG. 4B is a block diagram illustrating the format of a first frame buffer header from the linked list data structure of FIG. 4A;

FIG. 4C is a block diagram illustrating the format of a subsequent frame buffer header from the linked list data structure of FIG. 4A;

FIG. 7A is a block diagram illustrating the internal structure of the reclaim queue;

FIG. 7B is a block diagram illustrating the internal structure of the free buffer queue;

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
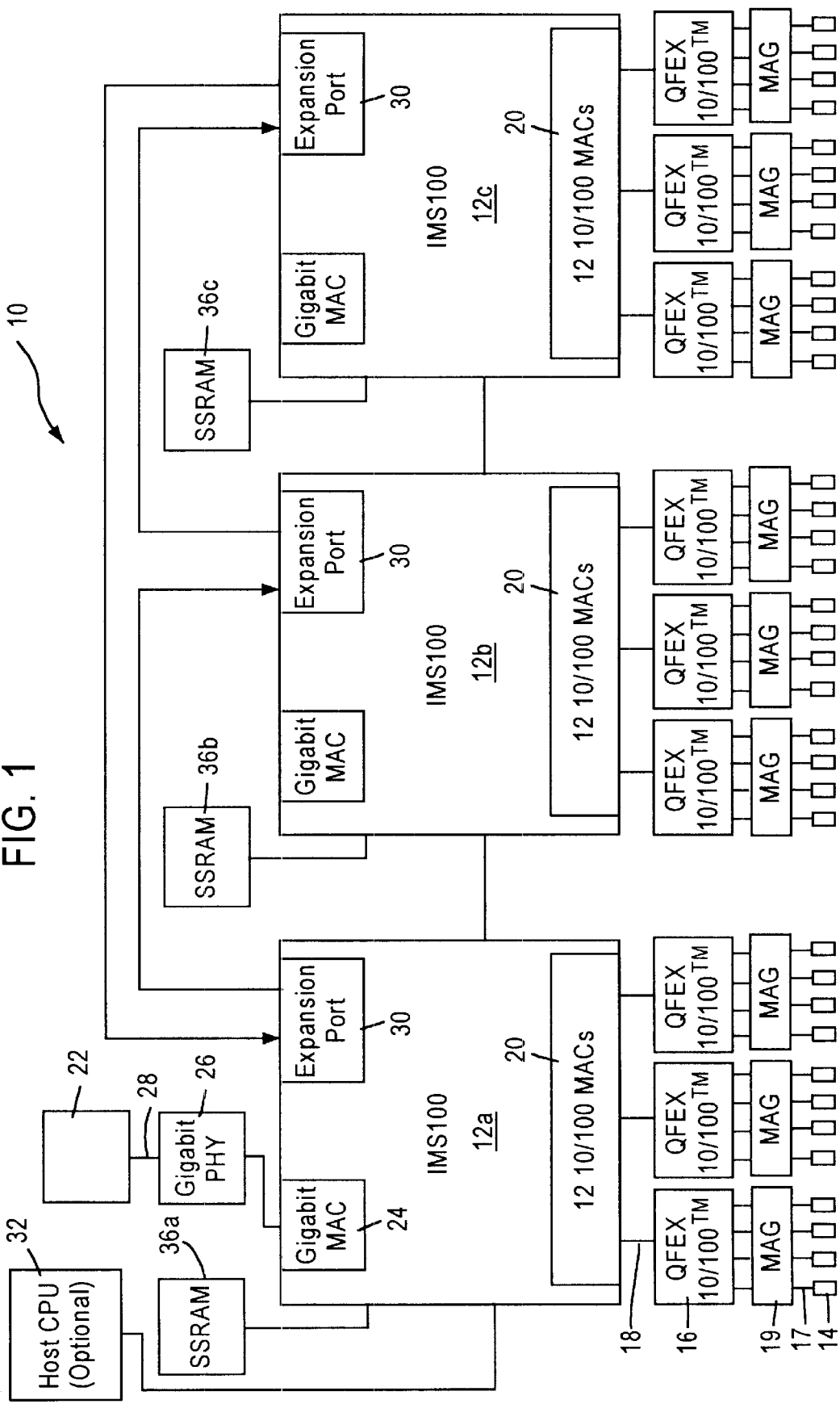
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
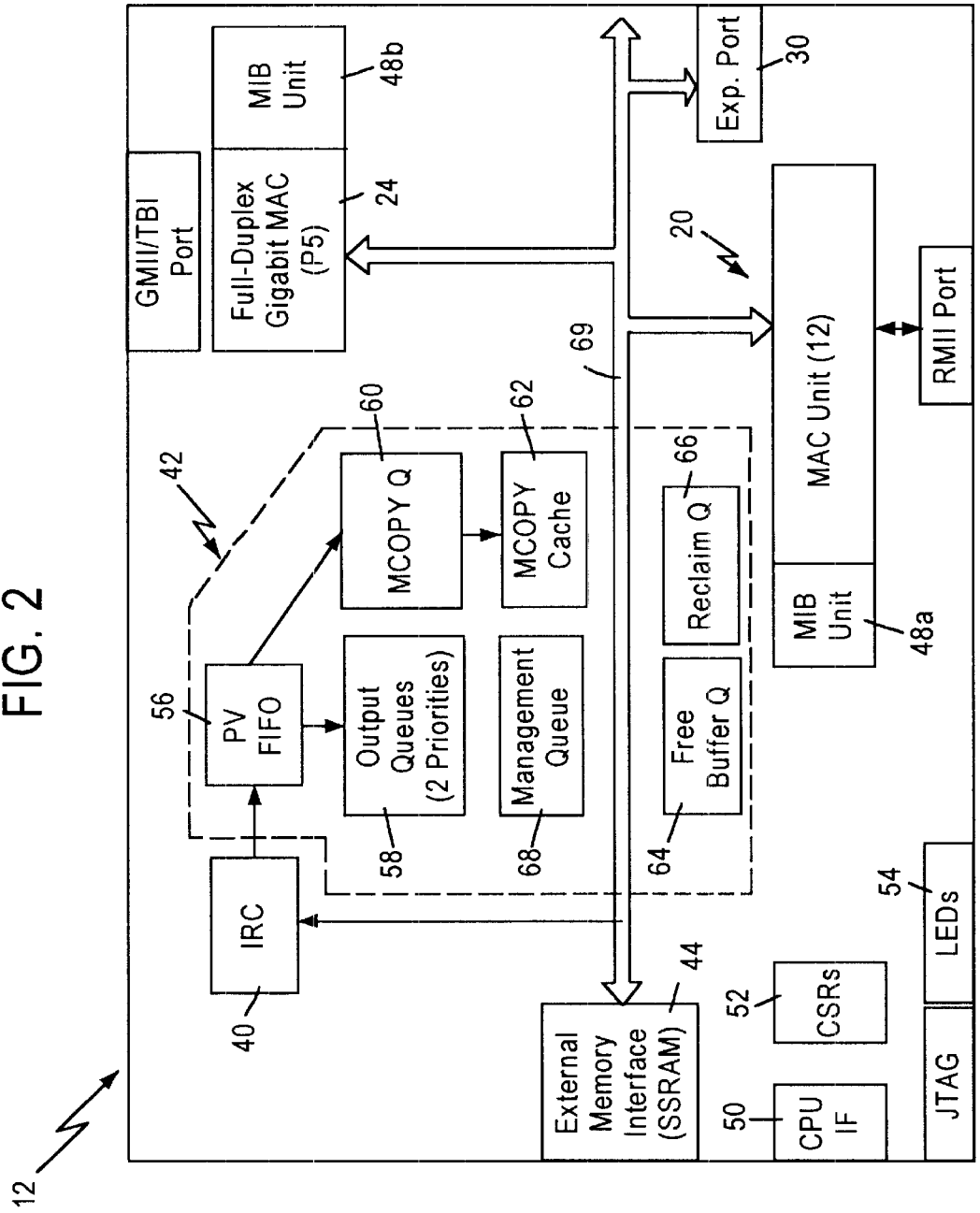
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
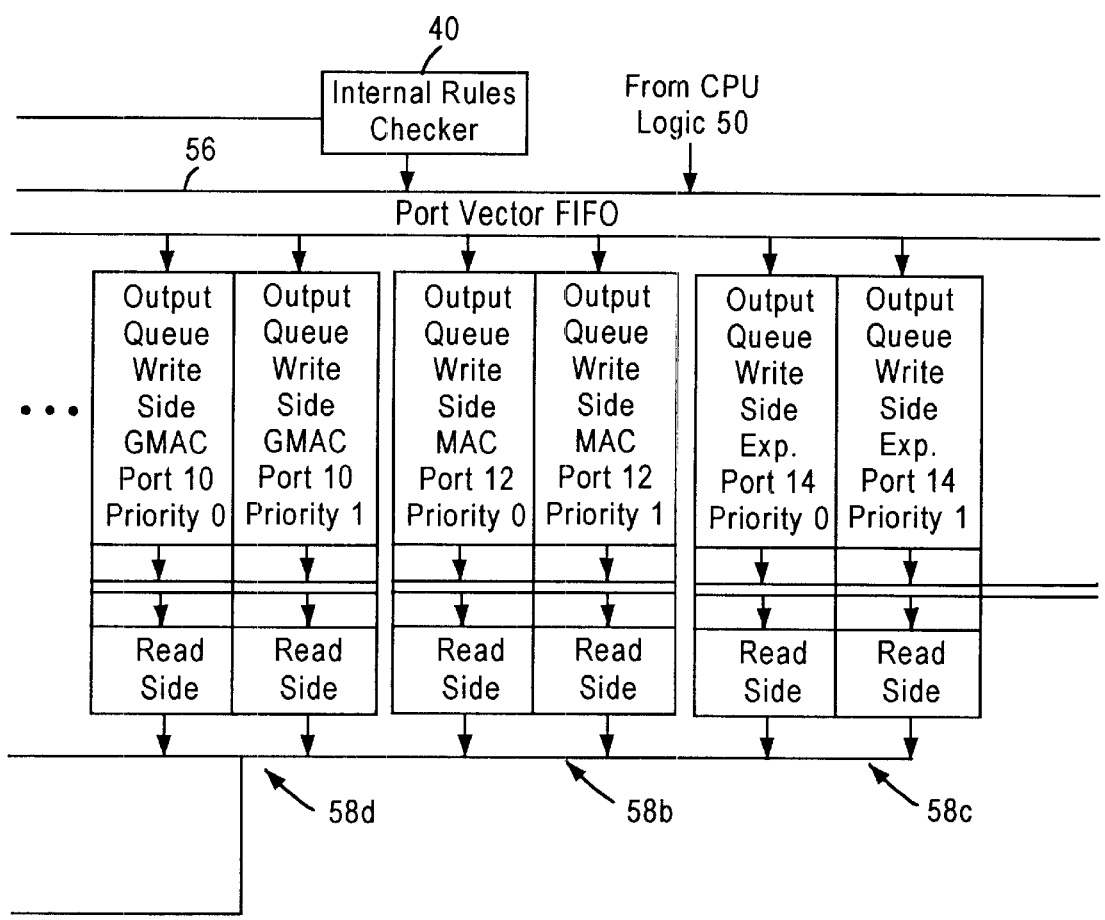
FIG. 3 is a block diagram illustrating in detail the switching subsystem of FIG. 2.
Figure 3C:
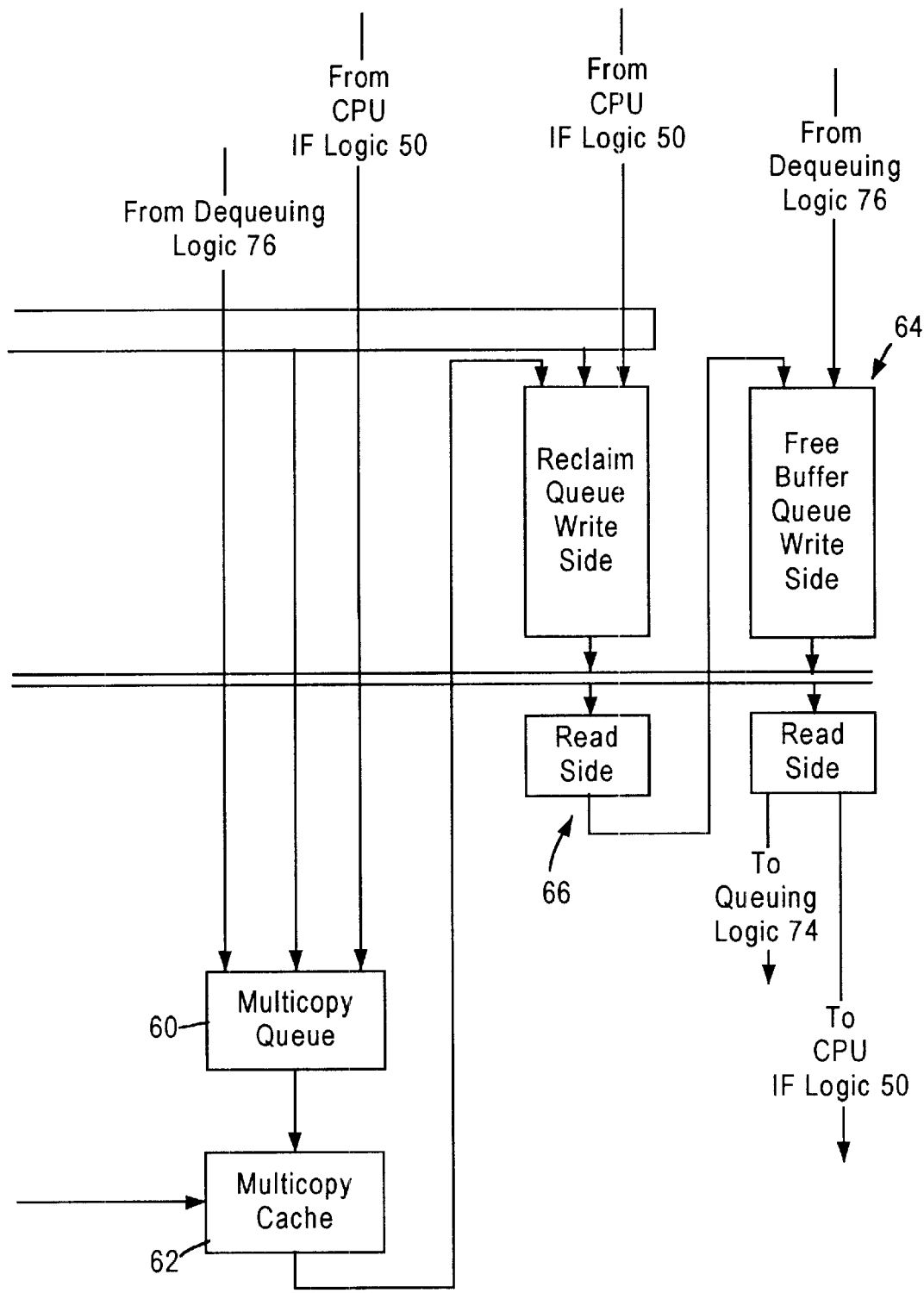

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the structure of frame buffers used to store received data frames will be discussed, followed by the details for reclaiming frame buffers after the received data frames have been transmitted to all designated output ports of the multiport switch 12.

Frame Buffer Structure

FIG. 4A illustrates a linked list data structure 400 used to store received data frames in the external memory, according to an exemplary embodiment of the present invention. The linked list data structure 400 includes multiple frame buffers 410 that are linked together in order to receive various-sized data frames. The frame buffers 410 used to create the linked list 400 illustrated in FIG. 4A are 256 bytes in length, although depending on the specific implementation of the present invention, buffer lengths of different sizes may be used.

As illustrated in FIG. 4A, there are two different types of frame buffers, namely a "first" frame buffer 410A and a "subsequent" frame buffer 410B. As suggested, the first frame buffer 410A is first in the linked list data structure 400. The subsequent frame buffers 410B correspond to all other frame buffers in the linked list data structure 400. Regardless of type, each frame buffer 410 (first or subsequent) includes a header portion 412 (e.g., buffer header) and a data portion 414. The buffer header 412 is 16 bytes in length, while the data portion 414 is 240 bytes in length. The buffer header 412 of each frame buffer 410 includes information, such as a pointer, that addresses a location in the external memory where the next frame buffer 410 is located. The frame buffers 410 are linked together by address pointers, stored in each buffer header 412, that indicate the location of the next frame buffer 412 in the external memory. According to the exemplary embodiment illustrated in FIG. 4A, the pointer used to address the first frame buffer is called a frame pointer. This is the identical frame pointer that is used to identify data frames by the IRC, control queues, and output queues.

FIGS. 4B and 4C illustrate the format of first and subsequent buffer headers 412A, 412B, respectively. As is readily apparent, the first and subsequent buffer headers 412A, 412B contain more than pointers that address the location of the frame buffers 410. Each frame buffer 410 stores a next buffer pointer that addresses the location, in the external memory, of the next frame buffer 410 in the linked list 400. The first buffer header 412A uses eight bytes, and reserves the remaining eight bytes. The subsequent buffer headers 412B use four bytes, and reserves the remaining 12 bytes.

As illustrated in FIGS. 4B and 4C, the first and subsequent buffer headers 412 contain a plurality of fields. The frame length field 416 is fourteen (14) bits long and stores a value corresponding to the total length of the received data frame. The value stored in the frame length field 416 takes into account the destination address of the received data frame and the frame check sequence. A "B" bit 418 (beginning of frame marker) is used to indicate whether the current frame buffer 410 contains the beginning of the received data frame. The "B" bit 418 is set (i.e., assigned a value of "1") to indicate that the current frame buffer 410 is the first frame buffer 410A used to store the received data frame, and cleared (i.e., assigned a value of "0") for all subsequent frame buffers 410B. An "E" Bit 420 (End of Frame Marker) is used to indicate that the current frame buffer 410 is the last frame buffer for a received data frame. When the "E" bit 420 is set (i.e., assigned a value of "1"), there are no more frame buffers 410 in the linked list 400. A "G" bit 422 (good frame) is used to indicate that the current data frame did not experience any receive errors. The "G" bit 422 and the "B" bit 418 are both used for diagnostic purposes. However, the MAC dequeuing logic does not check the value of the "G" bit 422. The buffer length field 424 is eight (8) bits long and stores a value that indicates the number of bytes in the data portion 414 of the current frame buffer 410, beginning with the first byte after the buffer header 412. The next buffer pointer field 426 is thirteen (13) bits long, and stores the value of the address pointer to the subsequent frame buffer 410B in the linked list 400. If the "E" bit 420 is set, however, the next buffer pointer is undefined.

As data frames are received and processed by the multiport switch, the data must eventually be output to one or more of the output ports. According to the exemplary embodiment disclosed herein, rather than storing multiple copies of the received data frames, various data structures are used to identify and access the frame buffers used to store the received data frames. The data structures are stored as entries and input into various queues. The queues are continually serviced such that all entries input into any particular queue will eventually be retrieved.

Queue Structure

Figure 5:
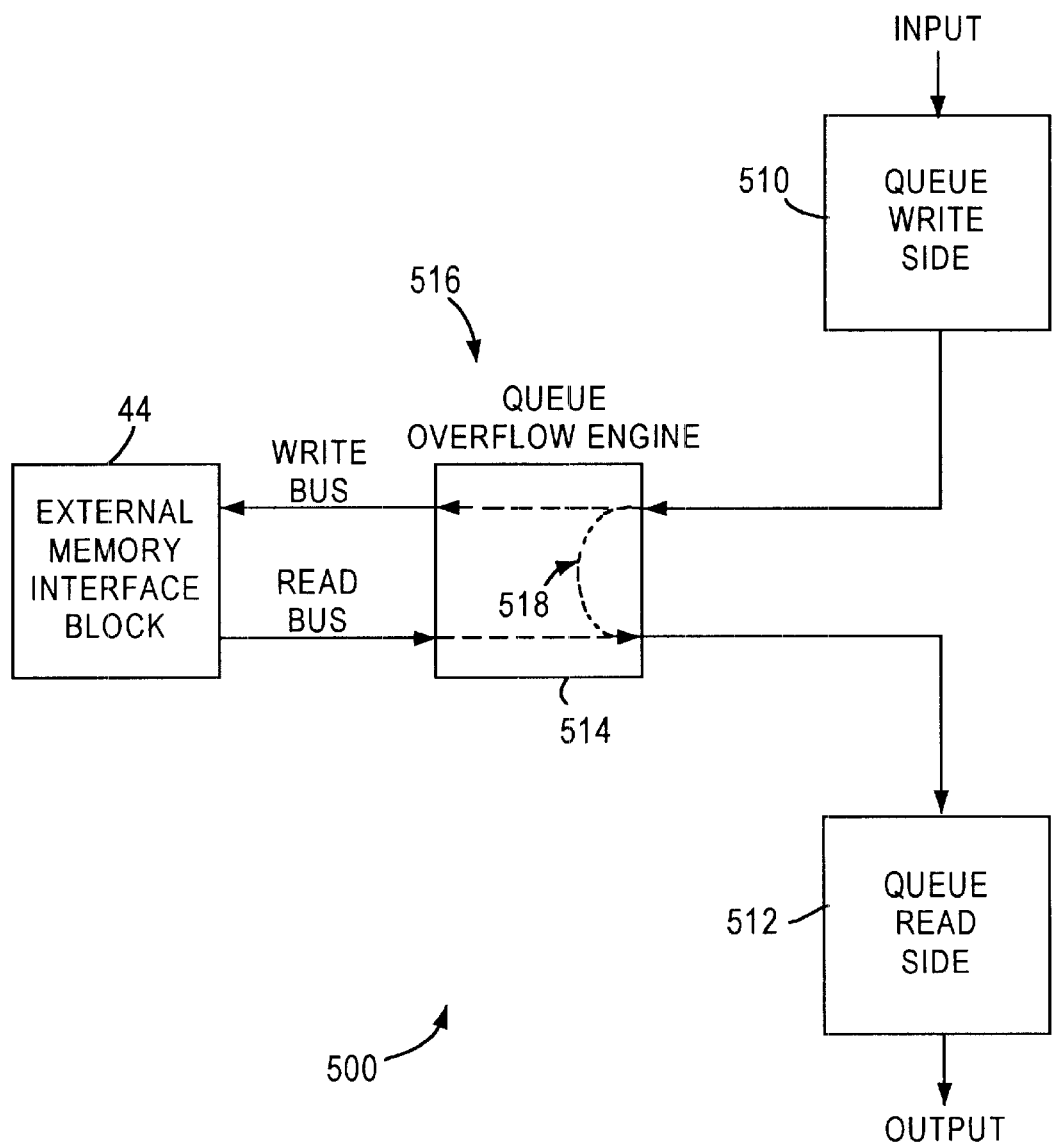
FIG. 5 is a block diagram of the external configuration of an exemplary queue structure according to an exemplary embodiment of the present invention.

FIG. 5 is a block diagram of the external structure of an exemplary queue structure 500 that may be used to store entries in accordance with an embodiment of the present invention. As is apparent from FIG. 5, the queue structure 500 illustrated has a three-part configuration. For highest performance, it is preferable to keep all of the queuing structure on the chip (referring to the multiport switch 12). The queue structure 500 includes a high performance, low capacity section that is on-chip, and an overflow area that is off-chip. The overflow area allows the queue to serve as a large capacity queue as needed, albeit with a relatively lower performance than the on-chip portion.

The queue structure 500 illustrated in FIG. 5 has three physical sections. These include a queue write side 510, a queue read side 512, and a queue overflow area 516. The queue overflow area 516 further incorporates a queue overflow engine 514, the external memory interface block 44, and the external memory 36. Access to the external memory 36 for the queue structure 500 is through the external memory interface 34, as described earlier. The present invention takes advantage of the bursting nature of current external memories, so that the data (e.g., frame pointers) is sent on and off the chip to the queue overflow area 516 in bursts over the external memory interface block 44 that connects the multiport switch 12 to the external memory 36.

The queue write side 510 and the queue read side 512 are located on the multiport switch 12. The write side 510 and the read side 512 are considered to be small, expensive resources. By contrast, the overflow area 516, forming the third part of the queue structure 500, is large and inexpensive. The write side 510 and the read side 512 provide high performance, while the path through the overflow area provides a low-performance, large capacity path.

In operation, the queue write side 510 receives an entry. In the exemplary embodiment of a multiport switch 12 according to the present invention, the entry can be a frame pointer that points to the first frame buffer 410 in external memory 36 in which the first 240 bytes of a data frame are stored. It should be apparent to those of skill in the art, however, that the queue structure 500 is not limited to frame pointers as entries, but is widely applicable for queuing other types of entries, both in multiport switches and in other technologies.

After the entry flows through and reaches the bottom of the queue write side 510, the queue overflow engine 514 makes a decision as to what to do with the entry. If there is space in the queue read side 512, and the overflow area 516 for that queue structure 500 is empty, then one or more entries are passed directly from the queue write side 510 to the queue read side 512 along the path designated by reference numeral 518. This passing of the entry (or entries) directly from the write side 510 to the read side 512 (referred to as "trickling") is performed entirely on the multiport switch 12, and therefore results in a low-latency, fast flow-through of an entry.

If the queue read side 512 is full, and there is at least a burst-size amount of data (e.g., 16 bytes worth of entries) in the queue write side 510, then the data is written in a burst fashion into the overflow area 516 for the queue structure 500. If the queue read side 512 is full, but there is not yet a burst-size amount of data in the queue write side 510, then the entry remains in the queue write side 510 and nothing further is done. Eventually, the queue read side 512 will empty, and when the queue read side 512 has enough space to accommodate a burst-size amount of data, and there is data in the overflow area 516, a burst of data is provided from the overflow area 516 into the queue read side 512.

In the queue structure 500, the read side 512 is acting most like a traditional queue, because it is from this portion that entries are taken, one by one. The queue write side 510 mostly serves a collection function to assemble the data into bursts for writing to the external memory 36. Hence, the present invention transforms single events (placing an entry into the queue structure 500) into a burst event. The write side 510 allows an accumulation of data to then burst, if necessary, to the overflow area 516 in the external memory 36. The overflow area 516 provides inexpensive storage in times of congestion, rather than dedicating expensive chip resources to a function that will only be needed on relatively rare occasions. Even though the present invention utilizes an overflow area 516 that is off-chip, access to this area is provided in a manner that is efficient, by bursting a number of bytes of information at a time and utilizing high speed (i.e., less than 10 nanosecond) SSRAM. This is in contrast to conventional queuing structures in which single entries are written to and read from the queue structure 500.

During operation, if there are a lot of entries arriving at the queue structure 500, these entries are placed into the overflow area 516 to avoid overflowing the read side 512. Hence, discarding of data frames is largely prevented with the queue structure 500 of the present invention. In addition, the total amount of memory dedicated to the overflow area 516 may be readily changed by changing the size of the external memory 36. Furthermore, the sizes of the individual specific overflow areas 516 are programmable to customize the queue sizes, without affecting the performance of the queue structures 500.

Typically, a queue is an ordered structure with a first-in, first-out arrangement. In some types of queue structures, however, such as the reclaim queue 66 and the free buffer pool 68, the order of entries does not matter. If it is possible to send data directly from the write side 510 to the read side 512, the present invention permits information to be directly sent via this route, hence bypassing the external memory 36. This is permitted even if there is information in the associated overflow area 516, as long as the information is not order-sensitive. For example, the reclamation of buffers is not order-sensitive, since any order in which the frame buffers 410 are eventually returned to the free list in the free buffer pool 68 after the frame buffer 410 is no longer needed to store data frames is acceptable. Hence, in order to avoid incurring the bandwidth of a write to the overflow area for the reclaim queue 66 in the external memory 36 when the data is not order-sensitive, the information is passed directly from the write side 510 to the read side 512, assuming the read side 512 has room for more entries. The reclaim queue 66 is an example of a type of queue that queues data which is not order-sensitive. However, there are many other types of data in different applications that are also not order-sensitive, so that this feature of the present invention finds utility in queues that queue these other types of data.

Reclaiming Buffers

Figure 6:
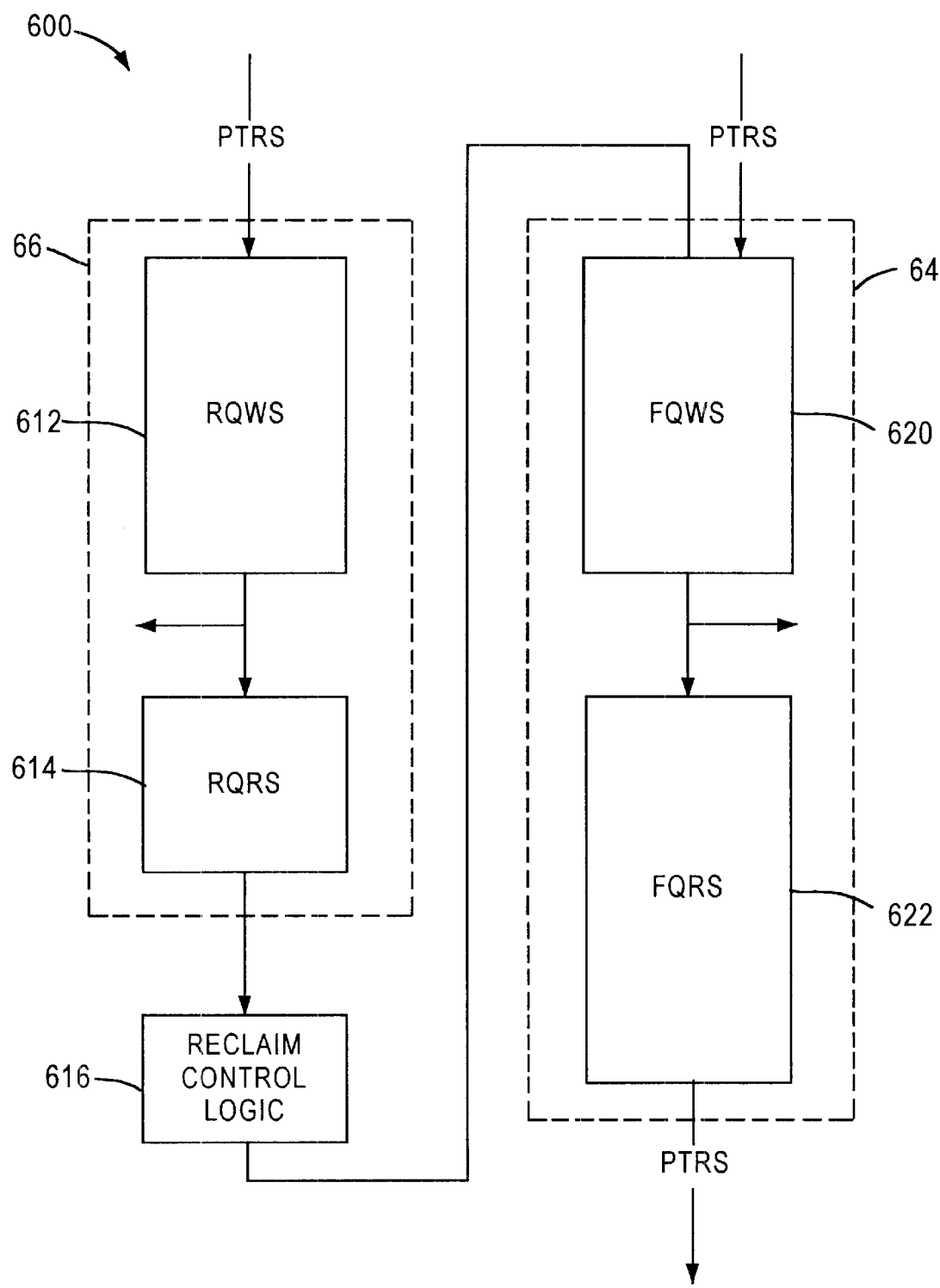
FIG. 6 is a block diagram illustrating an arrangement for reclaiming buffers according to an exemplary embodiment of the present invention.

FIG. 6 is a block diagram illustrating an arrangement 600 (hereinafter "reclaim arrangement") for reclaiming frame buffers 410, according to an exemplary embodiment of the present invention. The reclaim arrangement 600 includes a reclaim queue 66, a reclaim control logic 616, and a free buffer queue 64. The reclaim queue 66 and free buffer queue 64 illustrated in FIG. 6 are the same queues previously described with reference to FIG. 2.

The reclaim queue 66 is configured similar to the queue structure 500 previously described with reference to FIG. 5. Specifically, the reclaim queue 66 includes a reclaim queue write side 612, a reclaim queue read side 614, and a reclaim queue overflow portion (not shown). The reclaim queue 66 receives frame pointers, that address the locations in the external memory where data frames are stored, through the reclaim queue write side 612. According to the exemplary embodiment described herein, frame pointers may be input to the reclaim queue write side 612 from the port vector FIFO, the multicopy cache, and the host CPU. Based on specific implementations of the present invention, however, other entities may be configured to input frame pointers to the reclaim queue write side 612.

When frame pointers are written into an empty reclaim queue 66, they pass from the reclaim queue write side 612 to the reclaim queue read side 614 until the read side 614 is full. Additional frame pointers written to the reclaim queue write side 612 are placed into the reclaim queue overflow area in external memory (not shown). Once the reclaim queue read side 614 and the reclaim queue overflow area are full, additional frame pointers placed into the reclaim queue 66 begin to fill the reclaim queue write side 612.

Frame pointers input to the reclaim queue 66 do not need to be maintained in any particular order. Accordingly, frame pointers input to the reclaim queue write side 612 may be placed directly into available slots in the reclaim queue read side 614, without maintaining order relative to entries that are currently in the reclaim queue overflow area. Alternatively, the ordering of the frame pointers input to the reclaim queue write side 612 may be maintained such that when space clears in the reclaim queue read side 614, frame pointers are moved from the reclaim queue overflow area to the reclaim queue read side 614 and from the reclaim queue write side 612 to the reclaim queue overflow area.

The reclaim control logic 616 services the reclaim queue 66 by retrieving frame pointers from the reclaim queue read side 614. Frame pointers retrieved from the reclaim queue read side 614 are processed and the resulting buffer pointers are input to the free buffer queue 64. The reclaim control logic 616 ensures that all frame buffers used to store a received data frame are released by walking the linked list of frame buffers. As the linked list of frame buffers is walked, the reclaim control logic 616 inputs the free buffer pointer associated with each frame buffer into the free buffer queue 64.

The free buffer queue 64 is also configured similar to the queue structure 500 previously described with reference to FIG. 5. The free buffer queue 64 includes a free buffer queue write side 620, a free buffer queue read side 622, and a free buffer queue overflow portion (not shown). The free buffer queue 64 receives buffer pointers that address the locations, in the external memory 36, where free frame buffers are located. The buffer pointers may be input to the free buffer queue write side 620 from the reclaim queue 66, the MAC dequeuing logic 76, and the multicopy cache 62, although other entities may be configured to input free buffer pointers to the free buffer queue write side 620 based on different implementations of the present invention.

Buffer pointers written into the free buffer queue 64 pass from the free buffer queue write side 620 to the free buffer queue read side 622 until the read side 622 is full. Additional buffer pointers written to the free buffer queue write side 620 are then placed into the free buffer queue overflow area in external memory. Once the free buffer queue read side 622 and the free buffer queue overflow area are full, additional buffer pointers placed into the free buffer queue 618 begin to fill the free buffer queue write side 620.

The arrangement of entries within the free buffer queue 64 is similar to that of the reclaim queue 66, in that buffer pointers input to the free buffer queue 64 do not need to be maintained in any particular order. Buffer pointers input to the free buffer queue write side 620 may be placed directly into available slots in the free buffer queue read side 622, or they may be placed in the free buffer queue overflow area. Alternatively, the ordering of buffer pointers input to the free buffer queue write side 620 may be maintained such that when space clears in the free buffer queue read side 622, buffer pointers are moved from the free buffer queue overflow area to the free buffer queue read side 622 and from the free buffer queue write side 620 to the free buffer queue overflow area.

As previously stated, the free buffer queue 64 stores buffer pointers that address the locations in the external memory where free frame buffers are located. The buffer pointers are retrieved from the free buffer queue read side 622 by the MAC queuing logic and the host CPU 32. The host CPU 32 is configured to access the free buffer queue 64 through a free buffer queue access register (not shown). As data frames are received by the multiport switch 12, the MAC queuing logic 74 retrieves free buffer pointers from the free buffer queue 64 in order to determine the address of the next frame buffer that is available for storing the incoming data frame.

Figure 7C:
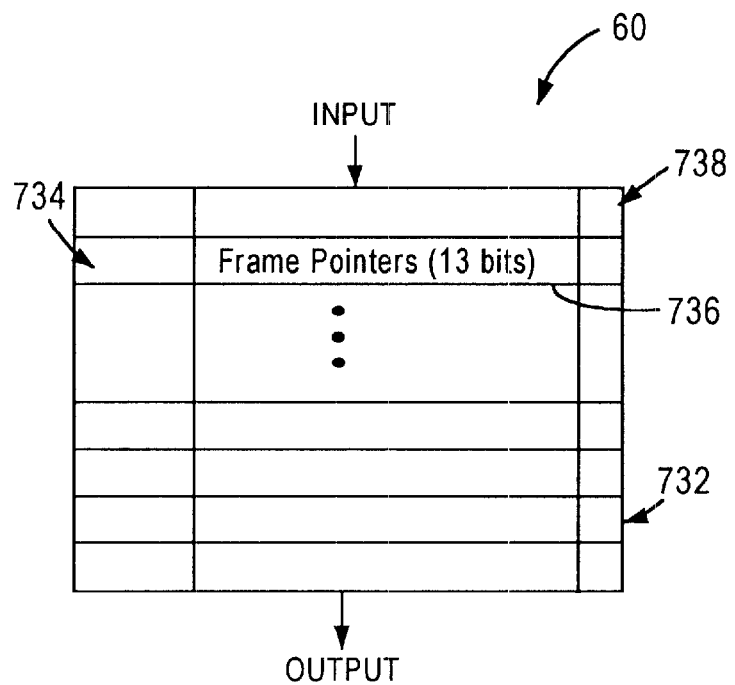
FIG. 7C is a block diagram illustrating the internal structure of the multicopy queue.

FIGS. 7A–7D illustrate exemplary internal representations of some of the various queue structures of the present invention. FIG. 7A illustrates the internal structure of the reclaim queue 66. As previously stated, the reclaim queue 66 stores frame pointers that address the locations of chains of frame buffers that store received data frames and are no longer needed by the forwarding process. According to the exemplary embodiment illustrated, each frame pointer is thirteen (13) bits long. In addition, the reclaim queue write side 612 is configured to store sixty four (64) entries 710, while the reclaim queue read side 614 is configured to store sixteen (16) entries 710. As previously stated, each entry corresponds to a frame pointer.

FIG. 7B illustrates the internal structure of the free buffer queue 64. The free buffer queue 64 is configured to store sixty four (64) entries 720 in both the free buffer queue write side 620 and the free buffer queue read side 622. Each entry 720 in the free buffer queue 64 corresponds to a free buffer pointer that addresses the location in the external memory where a free buffer is located.

FIG. 7C illustrates the internal structure of the multicopy queue 60. As previously stated, the multicopy queue 60 differs from the reclaim queue 66 and the free buffer queue 64 in that it does not include three distinct portions. The multicopy queue 60 is in the form of a single FIFO structure that has an input side and an output side. There is no separate overflow portion provided for the multicopy queue 60. The multicopy queue 60 stores 16 entries 732. Each entry 732 includes three fields, namely a copy number field 734, a frame pointer field 736, and a single buffer field 738. The copy number field 734 is a 4-bit field that stores a value corresponding to the number of copies of the received data frame that must be transmitted. The frame pointer field 736 is a 13-bit field that stores the value of a frame pointer that addresses the location in the external memory of the first frame buffer associated with the received data frame. The single buffer field 738 stores a value which indicates whether or not the received data frame is contained in a single frame buffer.

Figure 7D:
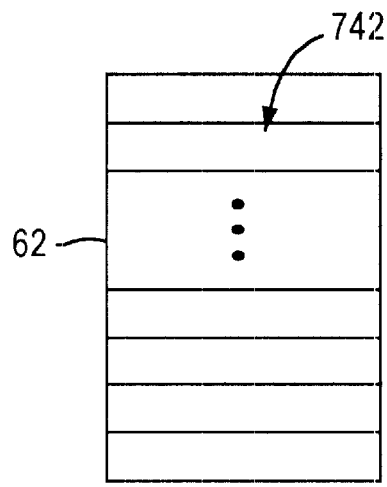
FIG. 7D is a block diagram illustrating the structure of the multicopy cache.

FIG. 7D illustrates the structure of the multicopy cache 62. The multicopy cache 62 is in the form of a randomly accessible cache memory. The multicopy cache 62 stores 8,192 entries 742 corresponding to the total number of frame pointers available in the external memory 36 at any given moment. Each entry 742 in the multicopy cache 62 is a 4-bit field that stores a value corresponding to the number of copies of the received data frame that must be transmitted. According to the illustrated embodiment, the entries 742 stored in the multicopy cache 62 correspond to the copy number field 734 of the multicopy queue 60.

Figure 8:
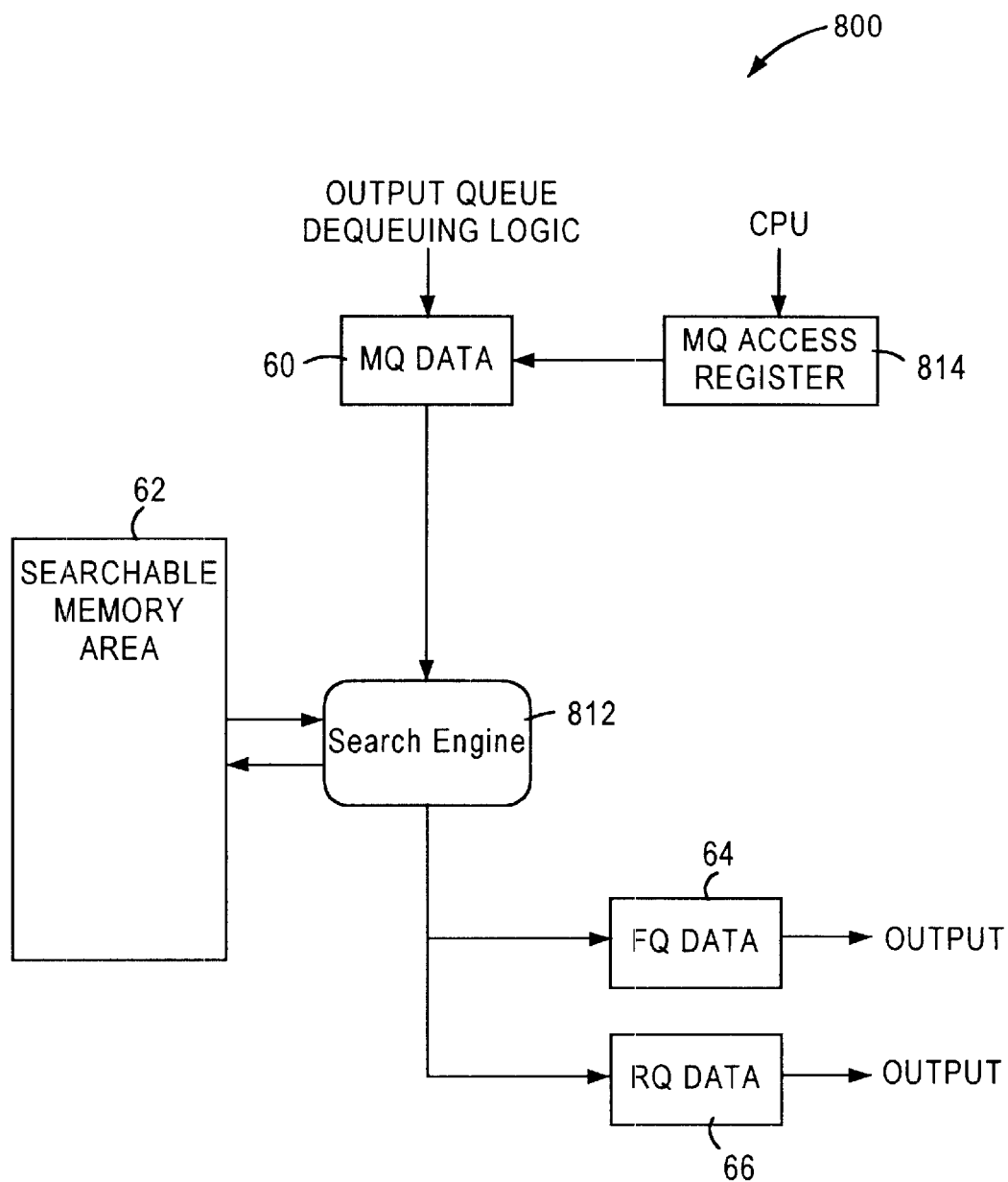
FIG. 8 is a block diagram illustrating an exemplary arrangement for processing multicopy entries.

FIG. 8 illustrates an exemplary arrangement 800 (hereinafter multicopy circuit) for reclaiming frame buffers that are used to store data frames that must be output to multiple output ports. The multicopy circuit 800 includes the multicopy queue 60, a searchable memory area such as, for example, the multicopy cache 62, and a search engine 812. The multicopy circuit 800 functions to retrieve entries from the multicopy queue 60, and reclaim the frame buffers used to store the received data frames once all copies thereof have been transmitted to all designated output ports.

According to the disclosed embodiment of the present invention, the multicopy cache 62 is configured to store 8192 entries. This corresponds to the total number of frame pointers available to the multiport switch 12. Accordingly, the specific number of entries that the multicopy cache 810 is configured to store will depend on the amount of external memory 36 allocated by a particular system for storing frame pointers. Each location in the multicopy cache 62 has a one-to-one correspondence with a particular frame pointer. Various decoding methodologies such as, for example, a hash function or table, may be used to convert an address specified by a frame pointer into the corresponding address within the multicopy cache 62.

The search engine 812 performs the task of decoding the addresses specified by frame pointers. The search engine 812 first retrieves entries from the multicopy queue 60. These entries may be input to the multicopy queue 60 by various entities of the multiport switch 12 such as, for example, the port vector FIFO 56 or the dequeuing logic 76 associated with a particular output queue. In addition, the host CPU 32 may input entries to the multicopy queue along a multicopy queue access register 814. As previously indicated, each entry 732 stored in the multicopy queue 60 contains 3 fields corresponding to a copy number, a frame pointer, and a single buffer bit. The search engine 812 accesses the value of the frame pointer from the retrieved entry and decodes the address specified by the frame pointer. The search engine 812 then searches the multicopy cache 62 to find the decoded address. The value stored in the decoded address is updated by the search engine 812 based on the copy number stored in the copy number field of the entry.

The value stored in the copy number field of the frame pointer retrieved from the multicopy queue 60 contains either the total number of output ports that will receive a copy of the received data frame, or an indication that one of the output ports has successfully transmitted its copy of the received data frame. According to one embodiment of the present invention, if the value stored in the copy number field of a frame pointer retrieved from the multicopy queue 60 is a positive integer, then the value corresponds to the total number of output ports that will receive a copy of the received data frame. A value of negative one (−1) indicates that one of the output ports has successfully transmitted its copy of the received data frame.

As previously stated, the search engine 812 updates the value stored in the decoded address within the multicopy cache 62 based upon the copy number stored in the copy number field of the frame pointer retrieved from the multicopy queue 60. If the copy number of the frame pointer retrieved from the multicopy queue 60 specifies the total number of output queues that will receive the retrieved data frame, then the search engine 812 updates the multicopy cache 62 by storing the value of the copy number of the frame pointer retrieved from the multicopy queue 60 into the decoded address location. If the copy number of the frame pointer retrieved from the multicopy queue 60 specifies that one of the output ports has successfully transmitted its copy of the received data frame, then the search engine 812 updates the multicopy cache 62 by decrementing the value stored therein by one. For example, typical operating conditions dictate that, for a given data frame, the search engine 812 will first receive a frame pointer from the multicopy queue 60 having a copy number that indicates the total number of output ports that will receive a copy of the received data frame. This value will be stored in the decoded address within the multicopy cache 62. Assume, for example, that this copy number is five. The next frame pointer decoded to the same address by the search engine 812 will include a copy number indicating that one of the output ports has successfully transmitted its copy of the received data frame. Accordingly, the search engine 812 will decrement the value stored in the decoded address by one. Based on the previous example, the search engine 812 will decrement the copy number stored in the decoded address from five to four. The updated value in the decoded address thus correctly reflects the remaining number of output ports that have not completed transmission of their copy of the received data frame.

The search engine 812 continually updates the values in the multicopy cache 62 as the output ports successfully transmit their copies of the received data frame. At some point in time, all output ports will have successfully transmitted their copy of the received data frame. The value stored in the multicopy cache 62 at this point in time should correctly reflect that all copies of the received data frame have been transmitted by the required output ports. According to the disclosed embodiment, this value will be zero. The search engine 812 then provides an indication to the multiport switch 12 that all copies of the received data frame have been transmitted and the frame buffers used to store this particular data frame may be reclaimed (i.e., released). Reclaiming the frame buffers allows the same frame buffers to be used for storing newly received data frames. The frame buffers may be reclaimed in several ways, such as directly rewriting new data therein or deleting the data contained in the frame buffer prior to storing a newly received data frame.

As previously indicated the received data frame may be stored in one of two ways depending on its size, i.e., in a single frame buffer or in multiple frame buffers. Accordingly, when all output ports have completed transmission of their copy of the received data frame, the manner in which the frame buffers are reclaimed will be dependent upon the number of frame buffers used to store the received data frame. The search engine 812 dictates the manner in which the frame buffers are reclaimed, based on the value of the single buffer bit stored in the retrieved entry. If the single bit buffer indicates that the received data frame is stored in multiple frame buffers, then the search engine inputs the frame pointer into the reclaim queue so that the frame buffers may be reclaimed. The frame pointer input to the reclaim queue corresponds to the received data frame that has successfully been transmitted by all designated output ports. If the single buffer bit indicates that the received data frame is stored in a single frame buffer, however, then the search engine 812 places the frame pointer directly into the free buffer queue. Hence, the frame pointer is immediately available and unnecessary processing is eliminated.

Figure 9:
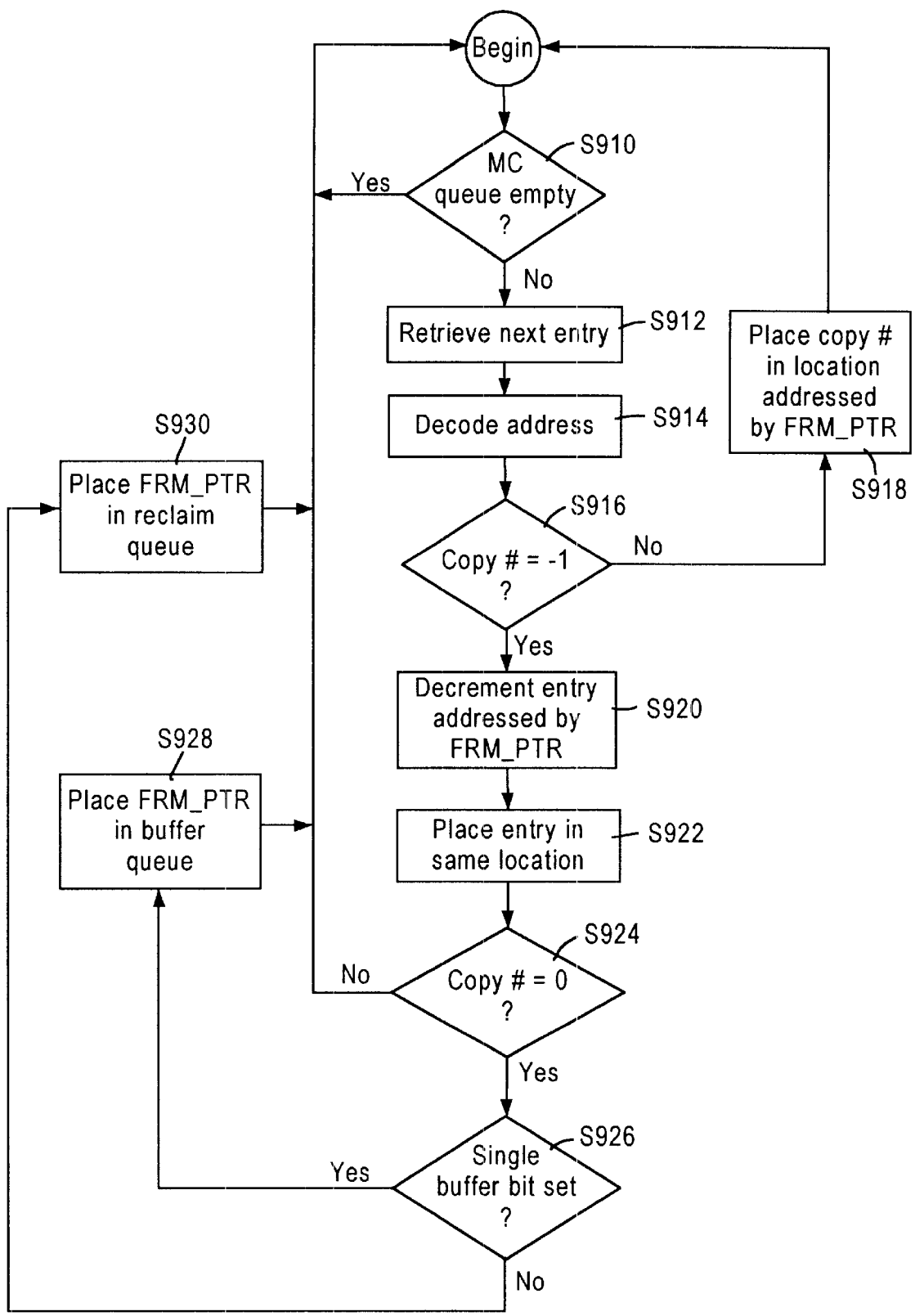
FIG. 9 is a flow chart illustrating the steps performed while processing entries from the multicopy queue.

FIG. 9 is a flow chart illustrating the steps performed by the multicopy circuit 800 while processing the entries from the multicopy queue 60. The search engine 812 continually monitors the status of the multicopy queue 60 in order to determine if there are any entries present therein. This is illustrated by step S910 where the search engine 812 determines if the multicopy queue 60 is empty. If the multicopy queue 60 is empty, then the search engine 812 will continually repeat step S910 until at least one entry is input to the multicopy queue 60. When the search engine 812 determines that the multicopy queue 60 is no longer empty, then control passes to step S912. At step S912, the entry (or entries) present at the output portion of the multicopy queue 60 is retrieved by the search engine 812. At step S914, the memory location addressed by the frame pointer stored in the retrieved entry is decoded. The decoded value corresponds to the location, in the multicopy cache 62, associated with the retrieved frame pointer. As previously indicated, each memory location addressed by the frame pointers is mapped to a corresponding location in the multicopy cache 62 using an appropriate matching function such as, for example, a hash function.

At step S916, the value of the copy number field of the retrieved frame pointer is examined. If the value of the copy number field does not equal negative one (−1), then the copy number specifies the total number of output ports that will transmit a copy of the received data frame and control passes to step S918. The search engine 812 places the value of the copy number stored in the retrieved frame pointer in the decoded location of the multicopy cache 62 specified by the frame pointer and control returns to step S910. If the value of the copy number stored in the retrieved frame pointer is equal to negative one (−1), then one of the output ports has successfully transmitted its copy of the received data frame and control passes to step S920. The search engine 812 accesses the decoded location in the multicopy cache 62, and the copy number value stored in the decoded location is decremented by one. At step S922, the decremented value is stored back into the decoded location in the multicopy cache 62.

Each time the search engine 812 decrements the value stored in the decoded location in the multicopy cache 62, it must also determine if all copies of the received data frame have been successfully transmitted by the specified output ports. At step S924, the search engine 812 determines if the value of the copy number stored in the currently decoded location of the multicopy cache 62 is equal to zero (0). If the value of the copy number stored in the multicopy cache is not equal to zero, then control returns to step S910 where it is determined if the next entry may be retrieved from the multicopy queue. If the value of the copy number stored in the multicopy cache is equal to zero, then all of the specified output ports have successfully transmitted their copy of the received data frame and control passes to step S926. At step S926, the search engine 812 examines the value of the single buffer field of the retrieved entry. If the single buffer bit is set (i.e.,=1), then the received data frame is stored in a single frame buffer and control passes to step S928. The search engine 812 places the frame pointer into the free buffer queue and control returns to step S910 in order to determine if the next entry is available in the multicopy queue. If the single buffer bit is not set (i.e.,=0), then the received data frame is stored in more than one frame buffer and control passes to step S930. The search engine 812 places the frame pointer into the reclaim queue and control returns to step S910.

Figure 10:
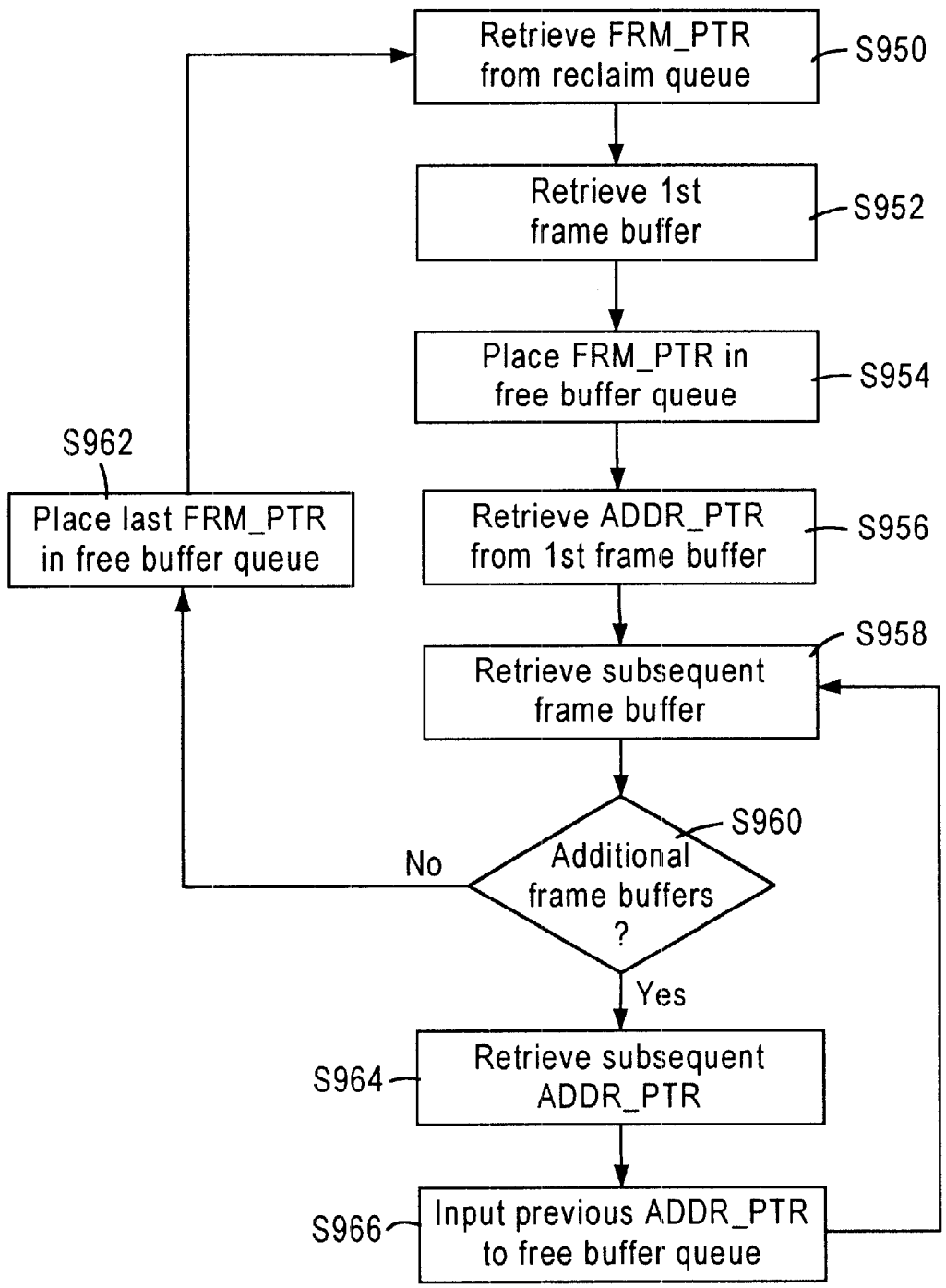
FIG. 10 is a flow chart illustrating the steps performed while reclaiming multiple frame buffers used to store received data frames.

FIG. 10 is a flow chart illustrating the steps performed by the reclaim arrangement in order to reclaim multiple frame buffers. The reclaim arrangement is used to reclaim frame buffers when the received data frame is stored in more than one frame buffer. As previously stated, if the received data frame is stored in a single frame buffer, then the multicopy circuit releases the frame buffer by placing the associated frame pointer directly into the free buffer queue.

At step S950, the first available frame pointer is retrieved from the reclaim queue by an appropriate control circuit such as, for example, the reclaim control logic 616 illustrated in FIG. 6. Depending on the specific implementation, the reclaim queue may be configured with an input portion, an overflow portion, and an output portion. In such situations, the frame pointers are retrieved from the output portion of the reclaim queue. The retrieved frame pointer addresses the location of the first frame buffer used to store the received data frame. The reclaim control logic 616 retrieves the first frame buffer at step S952 using the address information from the retrieved frame pointer. Once the first frame buffer is retrieved, the frame pointer used to address its location is no longer necessary. At step S954, the frame pointer used to address the first frame buffer is placed into the free buffer queue 64.

The first frame buffer is examined by the reclaim control logic, and the address pointer that addresses the location of the subsequent frame buffer used to store the received data frame is retrieved at step S956. At step S958, the subsequent frame buffer is retrieved based on the address pointer retrieved from the header of the first frame buffer. The reclaim control logic examines the header of the subsequent frame buffer in order to determine whether or not additional frame buffers were used to store the received data frame. This determination is made at step S960. If there are no additional frame buffers, then at step S962, the last frame buffer is placed into the free buffer queue. At this point, all of the frame buffers have been reclaimed and control returns to step S950. If there are additional frame buffers used to store the received data frame, then control passes to step S964. If there are additional frame buffers, then the previous frame buffer now becomes the "current" frame buffer for purposes of explaining the details of the invention. The header of the current frame buffer is examined and the address pointer that addresses the subsequent, or next, frame buffer is retrieved at step S964. At this point the address pointer used to address the location of the previous frame buffer (i.e., the "previous" address pointer) is no longer necessary. At step S966, the previous address pointer is placed into the free buffer queue. Control then returns to step S958, where the subsequent frame buffer is retrieved based on the address pointer retrieved at step S964.

According to the embodiment illustrated in FIG. 10, the reclaim control logic will continue to retrieve subsequent frame buffers until all the frame buffers used to store the received data frame have been reclaimed. Accordingly, steps S958 to S966 illustrate a recursive process that is performed to ensure that frame buffers are efficiently reclaimed. Step S960 sets forth the condition for exiting the recursive process by transferring control to step S950 when there are no additional frame buffers remaining.

As previously stated, entries are input into the multicopy queue 60 from three sources: the port vector FIFO 56, dequeuing logic 76, and host CPU 32. When the port vector FIFO 56 places an entry into the multicopy queue 60, the copy number field is set to the number of output ports that will transmit the data frame and the single buffer bit is set to "0". The dequeuing logic 76 of an output port places entries into the multicopy queue 60 upon successful transmission of a copy of the data frame. When the dequeuing logic 76 places an entry into the multicopy queue 60, the copy number field is set with a value of "−1" and the single buffer bit is appropriately set (i.e., either "1" or "0") depending on whether or not the data frame was stored in a single frame buffer. The host CPU 32 places an entry into the multicopy queue 60 whenever the management queue 68 must output a copy of the received data frame. When the host CPU 32 places an entry into the multicopy queue 60, the copy number field is set to a value of "−1" and the single buffer bit is appropriately set.

The search engine 812 constantly services the multicopy queue 60 in order to reclaim obsolete frame buffers. When the search engine 812 services the multicopy queue 60 and reads an entry that has a copy number ">1", the search engine 812 will decode the address specified by the frame pointer into a corresponding address location in the multicopy cache 62. Since the multicopy cache 62 is configured to store the same number of entries as the number of frame pointers defined by the system, there is a one-to-one correspondence between address locations in the multicopy cache 62 and frame pointers. When the search engine 812 retrieves an entry from the multicopy queue 60 that contains a copy number of "−1", the value of the entry in the decoded address location in the multicopy cache 62 is decremented. The search engine 812 also monitors the value of the entries in the multicopy cache 62 after each operation that decrements the value of the copy number in order to detect when all copies of the data frame have been transmitted, at which point the value stored in the entry would equal "0". When the search engine 812 detects that the value stored in a particular entry in the multicopy cache 62 is equal to "0", a frame pointer, corresponding to the decoded address location in the multicopy cache 62, is placed in the reclaim queue 66.

The reclaim queue 66 stores frame pointers that address the locations of chains of frame buffers that store received data frame and are no longer needed by the forwarding process. Frame pointers are input to the reclaim queue 66 from the search engine 812, port vector FIFO 56, and host CPU 32. As previously described, the search engine 812 places entries into the reclaim queue 66 when all copies of the data frame have been successfully transmitted. The port vector FIFO 56 will place frame pointers into the reclaim queue 66 under the following three conditions: a forwarding descriptor port vector value is null, a unicopy entry could not be placed into an output queue 58 because the output queue 58 was full, and a multicopy entry could not be placed into any of the specified output queues 58 because all of the output queues 58 were full. The host CPU 32 returns all frame pointers to the reclaim queue 66 regardless of the number of frame buffers used to store the data frame.

When the port vector FIFO 56 is not able to place an entry into any of the output queues 58, the frame pointer is returned to the reclaim queue 66 and the discarding of the frame is noted by the appropriate management circuit of the multiport switch 12. If the port vector FIFO 56 is not able to place one or more frame pointers for a multicopy entry, because one or more of the output queues 58 are full, the entries are only input to the output queues 58 with available space and the copy number placed into the multicopy queue 60 appropriately calculated to reflect only the successfully placed frame pointers. The non-placement of the frame pointer is noted for each of the output ports that were full.

The reclaim control logic 616 services the reclaim queue 66 by retrieving frame pointers and accessing the frame buffer that is addressed by the retrieved frame pointer. As previously stated, each frame buffer includes a header that indicates whether a subsequent frame buffer is used to store the data frame and an address pointer that addresses the location of the subsequent frame buffer. Based on this information, the reclaim control logic 616 walks the linked list of frame buffers. Each time a frame buffer is retrieved, the frame pointer (or address pointer) used to identify its location is returned to the free buffer queue 64. When additional data frames (i.e., new data frames) are received by the multiport switch 12, frame pointers are retrieved from the free buffer queue in order to address the frame buffers that will be used to store the newly received data frames.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of reclaiming buffers used to store data frames received by a network switch, the method comprising the steps:

inputting entries into a multicopy queue that queues entries corresponding to received data frames which must be transmitted to multiple output ports of the network switch, the entries storing frame pointers that address locations in memory where frame buffers that store received data frames are located;

determining if all copies of a received data frame have been output to the multiple output ports; and if all copies of the received data frame have been output to the multiple output ports, then performing a step of reclaiming one or more frame buffers used for storing the received data frame in a memory, based on the size of the received data frame, wherein a frame pointer addresses a location in the memory where each received data frame is stored, when the stored received data frame consists of a single frame buffer, the frame pointer is placed into a free buffer queue, and when the stored received data frame consists of multiple frame buffers, the frame pointer is placed into a reclaim queue.

2. A method of reclaiming buffers used to store data frames received by a network switch, the method comprising the steps:

inputting entries into a multicopy queue that queues entries corresponding to received data frames which must be transmitted to multiple output ports of the network switch, the entries storing frame pointers that address locations in memory where frame buffers that store received data frames are located;

determining if all copies of a received data frame have been output to the multiple output ports; and if all copies of the received data frame have been output to the multiple output ports, then performing a step of reclaiming one or more frame buffers used for storing the received data frame, based on the size of the received data frame, wherein the step of inputting entries into a multicopy queue includes the steps:

composing the entries from prescribed fields of a forwarding descriptor input to a port vector FIFO that queues forwarding descriptors received from a processor interface and an internal rules checker; and inputting the composed entries into the multicopy queue using the port vector FIFO.

3. A method of reclaiming buffers used to store data frames received by a network switch, the method comprising the steps:

inputting entries into a multicopy queue that queues entries corresponding to received data frames which must be transmitted to multiple output ports of the network switch, the entries storing frame pointers that address locations in memory where frame buffers that store received data frames are located;

determining if all copies of a received data frame have been output to the multiple output ports; and if all copies of the received data frame have been output to the multiple output ports, then performing a step of reclaiming one or more frame buffers used for storing the received data frame, based on the size of the received data frame, wherein the step of inputting entries into a multicopy queue includes the step of inputting entries into the multicopy queue from a dequeuing logic of one of the multiple output ports.

4. A method of reclaiming buffers used to store data frames received by a network switch, the method comprising the steps:

inputting entries into a multicopy queue that queues entries corresponding to received data frames which must be transmitted to multiple output ports of the network switch, the entries storing frame pointers that address locations in memory where frame buffers that store received data frames are located;

determining if all copies of a received data frame have been output to the multiple output ports; and if all copies of the received data frame have been output to the multiple output ports, then performing a step of reclaiming one or more frame buffers used for storing the received data frame, based on the size of the received data frame, wherein a management port will output a copy of the received data frame and the step of inputting entries into a multicopy queue includes the step of inputting entries into the multicopy queue from a host CPU via a multicopy queue access register.

5. A method of reclaiming buffers used to store data frames received by a network switch, the method comprising the steps:

inputting entries into a multicopy queue that queues entries corresponding to received data frames which must be transmitted to multiple output ports of the network switch, the entries storing frame pointers that address locations in memory where frame buffers that store received data frames are located;

determining if all copies of a received data frame have been output to the multiple output ports; and if all copies of the received data frame have been output to the multiple output ports, then performing a step of reclaiming one or more frame buffers used for storing the received data frame, based on the size of the received data frame, wherein the step of determining if all copies of a received data frame have been output includes the step of determining if all copies of a received data frame have been output using a multicopy cache arrangement having a searchable memory area.

6. The method of claim 5, wherein the step of determining if all copies of a received data frame have been output further includes the steps:

retrieving an entry from the multicopy queue;

decoding an address specified by a frame pointer, stored in the retrieved entry, into a corresponding address in the searchable memory area; and storing the value of a copy number, stored in the retrieved entry, into the decoded address in the searchable memory area.

7. The method of claim 6, wherein the step of storing the value of a copy number stored in the retrieved entry into the decoded address further includes the steps:

determining whether the value of the copy number specifies the number of output ports to which the received data frame must be transmitted, or successful transmission of the received data frame to one of the multiple output ports;

if the copy number specifies the number of output ports to which the received data frame must be transmitted, then storing the value of the copy number in a corresponding decoded address in the searchable memory area; and if the copy number specifies successful transmission of the received data frame to one of the multiple output ports, then performing the steps:
retrieving the value stored in decoded address in the searchable memory area,
decrementing the retrieved value, and
storing the decremented value back into the decoded address in the searchable memory area.

8. The method of claim 7, further comprising the steps:
if the value stored in the decoded address of the searchable memory area is greater than zero, then providing an indication that at least one of the multiple output ports has not received a copy of the received data frame; and
if the value stored in the decoded address of the searchable memory area is equal to zero, then providing an indication that all copies of the received data frame have been transmitted to the multiple output ports.

9. A method of reclaiming buffers used to store data frames received by a network switch, the method comprising the steps:
inputting entries into a multicopy queue that queues entries corresponding to received data frames which must be transmitted to multiple output ports of the network switch, the entries storing frame pointers that address locations in memory where frame buffers that store received data frames are located;
determining if all copies of a received data frame have been output to the multiple output ports; and
if all copies of the received data frame have been output to the multiple output ports, then performing a step of reclaiming one or more frame buffers used for storing the received data frame, based on the size of the received data frame, wherein
the step of reclaiming one or more frame buffers includes a step of placing the frame pointer stored in a selected entry into one of a reclaim queue that queues frame pointers and a free buffer queue that queues frame pointers which address the locations of free buffers, in the memory, that are available for storing newly received data frames.

10. A method of reclaiming buffers used to store data frames received by a network switch, the method comprising the steps:
inputting entries into a multicopy queue that queues entries corresponding to received data frames which must be transmitted to multiple output ports of the network switch, the entries storing frame pointers that address locations in memory where frame buffers that store received data frames are located;
determining if all copies of a received data frame have been output to the multiple output ports; and
if all copies of the received data frame have been output to the multiple output ports, then performing a step of reclaiming one or more frame buffers used for storing the received data frame, based on the size of the received data frame, wherein:
each entry in the multicopy queue includes a single buffer bit that indicates whether the received data frame is stored in a single frame buffer or plural frame buffers; and the step of reclaiming one or more frame buffers further includes the steps:
if the received frame data frame is stored in multiple frame buffers, then placing the frame pointer, that addresses the location of the received data frame, into a reclaim queue that queues frame pointers which identify the locations of the first frame buffers used to store received data frames, and
if the received data frame is stored in a single frame buffer, then placing the frame pointer, that addresses the location of the received data frame, into a free buffer queue that queues frame pointer which address the locations of free buffers that are available for storing newly received data frames.

11. A method of reclaiming buffers used to store data frames received by a network switch, the method comprising the steps:
inputting entries into a multicopy queue that queues entries corresponding to received data frames which must be transmitted to multiple output ports of the network switch, the entries storing frame pointers that address locations in memory where frame buffers that store received data frames are located;
determining if all copies of a received data frame have been output to the multiple output ports; and
if all copies of the received data frame have been output to the multiple output ports, then performing a step of reclaiming one or more frame buffers used for storing the received data frame, based on the size of the received data frame, wherein
the size of the received data frame requires storage thereof in a single frame buffer and the step of reclaiming one or more buffers further includes the step of inputting the frame pointer stored in the selected entry into a free buffer queue that queues frame pointers which address the locations, in the external memory, of free buffers that are available for storing newly received data frames.

12. The method of claim 1, wherein the size of the received data frame requires storage thereof in plural frame buffers and the step of reclaiming one or more frame buffers further includes the steps:
placing the frame pointer into a reclaim queue that queues frame pointers; and
reclaiming the plural frame buffers used to store the received data frame.

13. The method of claim 12, wherein the step of reclaiming the plural frame buffers includes the steps:
retrieving, from a location in the memory, an address pointer stored in a header of a first frame buffer addressed by the frame pointer placed in the reclaim queue;
inputting the frame pointer retrieved from the reclaim queue into a free buffer queue that queues frame pointers which address the locations, in the external memory, of free buffers that are available for storing newly received data frames; and
reclaiming all additional frame buffers used to store the received data frame.

14. The method of claim 13, wherein the step of reclaiming all additional frame buffers includes the steps:
retrieving a subsequent frame buffer identified by either the retrieved address pointer or a retrieved subsequent address pointer;
retrieving a subsequent address pointer from a header of the subsequent frame buffer;

if the subsequent frame buffer is a second frame buffer used to store the received data frame then repeating the steps of retrieving a subsequent frame buffer and retrieving a subsequent address pointer;

inputting a previous address pointer retrieved from the header of a previous frame buffer into the free buffer queue; and repeating the steps of retrieving a subsequent frame buffer, retrieving a subsequent address pointer, and inputting a previous address pointer, until all additional frame buffers used to store the received data frame have been reclaimed.

15. Apparatus for reclaiming buffers used to store data frames received by a network switch, said apparatus comprising:

a multicopy queue for queuing entries corresponding to received data frames which must be transmitted to multiple output ports of the network switch, said entries storing frame pointers that address locations in memory where frame buffers for storing said received data frames are located;

a free buffer queue for queuing frame pointers that identify locations in said memory where reclaimed frame buffers are located, said reclaimed frame buffers being available for storing newly received data frames; and a multicopy circuit configured to:
retrieve entries from an output portion of said multicopy queue,
determine if all copies of a received data frame have been transmitted to said multiple output ports, and
if all copies of said received data frame have been transmitted, then reclaiming one or more frame buffers used for storing the received data frame, based on the size of the received data frame, based on the size of the received data frame, wherein when the stored received data frame consists of a single frame buffer, the frame pointer is placed into the free buffer queue, and when the stored received data frame consists of multiple frame buffers, the frame pointer is placed into a reclaim queue.

16. Apparatus for reclaiming buffers used to store data frames received by a network switch, said apparatus comprising:

a multicopy queue for queuing entries corresponding to received data frames which must be transmitted to multiple output ports of the network switch, said entries storing frame pointers that address locations in memory where frame buffers for storing said received data frames are located;

a free buffer queue for queuing frame pointers that identify locations in said memory where reclaimed frame buffers are located, said reclaimed frame buffers being available for storing newly received data frames; and a multicopy circuit configured to:
retrieve entries from an output portion of said multicopy queue,
determine if all copies of a received data frame have been transmitted to said multiple output ports, and
if all copies of said received data frame have been transmitted, then reclaiming one or more frame buffers used for storing the received data frame, based on the size of the received data frame; and a port vector FIFO for queuing forwarding descriptors received from a processor interface and an internal rules checker, composing entries from prescribed fields of said forwarding descriptors, and inputting said composed entries into said multicopy queue.

17. Apparatus for reclaiming buffers used to store data frames received by a network switch, said apparatus comprising:

a multicopy queue for queuing entries corresponding to received data frames which must be transmitted to multiple output ports of the network switch, said entries storing frame pointers that address locations in memory where frame buffers for storing said received data frames are located;

a free buffer queue for queuing frame pointers that identify locations in said memory where reclaimed frame buffers are located, said reclaimed frame buffers being available for storing newly received data frames; and a multicopy circuit configured to:
retrieve entries from an output portion of said multicopy queue,
determine if all copies of a received data frame have been transmitted to said multiple output ports, and
if all copies of said received data frame have been transmitted, then reclaiming one or more frame buffers used for storing the received data frame, based on the size of the received data frame, wherein each of said multiple output ports includes a dequeuing logic for inputting entries into said multicopy queue.

18. Apparatus for reclaiming buffers used to store data frames received by a network switch, said apparatus comprising:

a multicopy queue for queuing entries corresponding to received data frames which must be transmitted to multiple output ports of the network switch, said entries storing frame pointers that address locations in memory where frame buffers for storing said received data frames are located;

a free buffer queue for queuing frame pointers that identify locations in said memory where reclaimed frame buffers are located, said reclaimed frame buffers being available for storing newly received data frames; and a multicopy circuit configured to:
retrieve entries from an output portion of said multicopy queue,
determine if all copies of a received data frame have been transmitted to said multiple output ports, and
if all copies of said received data frame have been transmitted, then reclaiming one or more frame buffers used for storing the received data frame, based on the size of the received data frame;

a management port for outputting a copy of said received data frame; and a host CPU for inputting entries into said multicopy queue, via a multicopy queue access register, when said management queue must output a copy of said received data frame.

19. Apparatus for reclaiming buffers used to store data frames received by a network switch, said apparatus comprising:

a multicopy queue for queuing entries corresponding to received data frames which must be transmitted to multiple output ports of the network switch, said entries storing frame pointers that address locations in memory where frame buffers for storing said received data frames are located;

a free buffer queue for queuing frame pointers that identify locations in said memory where reclaimed frame buffers are located, said reclaimed frame buffers being available for storing newly received data frames; and a multicopy circuit configured to:
retrieve entries from an output portion of said multicopy queue,
determine if all copies of a received data frame have been transmitted to said multiple output ports, and
if all copies of said received data frame have been transmitted, then reclaiming one or more frame buffers used for storing the received data frame, based on the size of the received data frame, wherein said multicopy circuit includes:
a searchable memory area for storing values corresponding to the number of copies of each received data frame to be transmitted; and
a search engine for searching said searchable memory area and updating the values stored therein to reflect the current number of copies of each received data frame to be transmitted.

20. The apparatus of claim 19, wherein said search engine is configured to:
retrieve entries from the output portion of said multicopy queue;
decode addresses specified by frame pointers stored in said retrieved entries into corresponding addresses in said searchable memory area; and
update the values stored in said searchable memory area based on copy numbers stored in said retrieved entries and said decoded addresses.

21. The apparatus of claim 20, wherein said search engine is further configured to:
determine whether the value of a copy number stored in a selected entry specifies the number of output ports to which a particular received data frame must be transmitted, or successful transmission of said particular received data frame to one of the multiple output ports;
if the value of the copy number specifies the number of output ports to which said particular received data frame must be transmitted, then storing the value of the copy number in a corresponding decoded address in said searchable memory area; and
if the value of the copy number specifies successful transmission of said particular received data frame to one of the multiple output ports, then performing the steps:
retrieving the value stored in the decoded address in said searchable memory area,
decrementing the retrieved value, and
storing the decremented value back into the decoded address in said searchable memory area.

22. The apparatus of claim 21, wherein:
if the value stored in the decoded address in said searchable memory area is greater than zero, then causing said search engine to provide an indication that at least one of the multiple output ports has not received its copy of said particular received data frame; and
if the value stored in the decoded address in said searchable memory area is equal to zero, then causing said search engine to provide an indication that all copies of said particular received data frame have been transmitted to the multiple output ports.

23. Apparatus for reclaiming buffers used to store data frames received by a network switch, said apparatus comprising:

a multicopy queue for queuing entries corresponding to received data frames which must be transmitted to multiple output ports of the network switch, said entries storing frame pointers that address locations in memory where frame buffers for storing said received data frames are located;
a free buffer queue for queuing frame pointers that identify locations in said memory where reclaimed frame buffers are located, said reclaimed frame buffers being available for storing newly received data frames; and
a multicopy circuit configured to:
retrieve entries from an output portion of said multicopy queue,
determine if all copies of a received data frame have been transmitted to said multiple output ports, and
if all copies of said received data frame have been transmitted, then reclaiming one or more frame buffers used for storing the received data frame, based on the size of the received data frame, wherein
each of said entries includes a single buffer bit that indicates whether a particular received data frame is stored in a single frame buffer or plural frame buffers; and
said multicopy circuit reclaims said one or more frame buffers based on the content of said single buffer bit.

24. Apparatus for reclaiming buffers used to store data frames received by a network switch, said apparatus comprising:
a multicopy queue for queuing entries corresponding to received data frames which must be transmitted to multiple output ports of the network switch, said entries storing frame pointers that address locations in memory where frame buffers for storing said received data frames are located;
a free buffer queue for queuing frame pointers that identify locations in said memory where reclaimed frame buffers are located, said reclaimed frame buffers being available for storing newly received data frames; and
a multicopy circuit configured to:
retrieve entries from an output portion of said multicopy queue,
determine if all copies of a received data frame have been transmitted to said multiple output ports, and
if all copies of said received data frame have been transmitted, then reclaiming one or more frame buffers used for storing the received data frame, based on the size of the received data frame, wherein
size of a received data frame indicates that said received data frame is stored in a single frame buffer, and said multicopy circuit is configured to reclaim said one or more frame buffers by performing a step of inputting the frame pointer stored in said selected entry into a free buffer queue that queues frame pointers which address the locations, in said memory, of free buffers that are available for storing newly received data frames.

25. Apparatus for reclaiming buffers used to store data frames received by a network switch, said apparatus comprising:
a multicopy queue for queuing entries corresponding to received data frames which must be transmitted to multiple output ports of the network switch, said entries storing frame pointers that address locations in memory where frame buffers for storing said received data frames are located;
a free buffer queue for queuing frame pointers that identify locations in said memory where reclaimed frame buffers are located, said reclaimed frame buffers being available for storing newly received data frames; and a multicopy circuit configured to:
retrieve entries from an output portion of said multicopy queue,
determine if all copies of a received data frame have been transmitted to said multiple output ports, and
if all copies of said received data frame have been transmitted, then reclaiming one or more frame buffers used for storing the received data frame, based on the size of the received data frame, wherein
the size of a particular received data frame indicates that said particular received data frame is stored in plural frame buffers;
said multicopy circuit is configured to reclaim said one or more frame buffers by performing a step of inputting the frame pointer stored in said selected entry into a reclaim queue that queues frame pointers; and
said apparatus further includes a reclaim control logic for retrieving frame pointers from said reclaim queue and reclaiming said plural frame buffers used to store said particular received data frame.

26. The apparatus of claim 25, wherein said reclaim control logic reclaims plural frame buffers by performing the steps:
retrieving, from said reclaim queue, a frame pointer that addresses the location of a first frame buffer in said memory;
retrieving an address pointer stored in a header of said first frame buffer;
inputting the frame pointer retrieved from said reclaim queue into a free buffer queue that queues frame pointers which address the locations, in said memory, of free buffers that are available for storing newly received data frames; and
reclaiming all additional frame buffers used to store said particular received data frame.

27. The apparatus of claim 26, wherein said reclaim queue logic reclaims all additional frame buffers by performing the steps:
retrieving a subsequent frame buffer addressed by either the retrieved address pointer or a retrieved subsequent address pointer;
retrieving a subsequent address pointer from a header of said subsequent frame buffer;
if the subsequent frame buffer is a second frame buffer used to store the received data frame then repeating the steps of retrieving a subsequent frame buffer and retrieving a subsequent address pointer;
inputting said subsequent address pointer retrieved from the header of said subsequent frame buffer into said free buffer queue; and
repeating the steps of retrieving a subsequent frame buffer, retrieving a subsequent address pointer, and inputting said subsequent address pointer, until all frame buffers used to store said particular received data frame have been reclaimed.

* * * * *

UNITED STATES PATENT AND TRADEMARK OFFICE
CERTIFICATE OF CORRECTION

PATENT NO.    : 6,504,846 B1                                       Page 1 of 1
DATED         : January 7, 2003
INVENTOR(S)   : Ching Yu et al.

It is certified that error appears in the above-identified patent and that said Letters Patent is hereby corrected as shown below:

<u>Column 25,</u>
Lines 33-34, delete first occurrence of "based on the size of the received data frame".

Signed and Sealed this

Fifth Day of August, 2003

JAMES E. ROGAN
*Director of the United States Patent and Trademark Office*